(12) United States Patent
Christensen et al.

(10) Patent No.: US 11,820,306 B2
(45) Date of Patent: *Nov. 21, 2023

(54) SYSTEM AND METHOD FOR DAMPENING IMPACT TO A VEHICLE

(71) Applicant: STATE FARM MUTUAL AUTOMOBILE INSURANCE COMPANY, Bloomington, IL (US)

(72) Inventors: Scott T. Christensen, Salem, OR (US);
Brian M. Fields, Normal, IL (US);
Stephen R. Prevatt, Normal, IL (US);
Steve Roberson, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/327,896

(22) Filed: May 24, 2021

(65) Prior Publication Data

US 2021/0276502 A1   Sep. 9, 2021

Related U.S. Application Data

(63) Continuation of application No. 15/996,763, filed on Jun. 4, 2018, now Pat. No. 11,046,266.

(51) Int. Cl.
*B60R 19/00* (2006.01)
*B60R 21/0132* (2006.01)
(Continued)

(52) U.S. Cl.
CPC .......... *B60R 19/00* (2013.01); *B60R 21/0132* (2013.01); *B60R 21/0134* (2013.01);
(Continued)

(58) Field of Classification Search
CPC .............. B60R 19/00; B60R 21/0132; B60R 2021/0104; B60R 2019/007;
(Continued)

(56) References Cited

U.S. PATENT DOCUMENTS 3,040,925 A    6/1962 Mills
4,252,340 A    2/1981 Egging
(Continued)

FOREIGN PATENT DOCUMENTS

CN            106043076 A       10/2016

*Primary Examiner* — Jason Holloway
(74) *Attorney, Agent, or Firm* — MARSHALL, GERSTEIN & BORUN LLP

(57) ABSTRACT

Systems and methods are provided for dampening impact to a vehicle. The system may include a vehicle frame component; a plurality of adjustable exterior vehicle body components coupled to the frame component, wherein the vehicle body components are on different sides of a vehicle and are configurable to dampen an external force exerted on the vehicle; a plurality of actuator components configured to adjust physical configurations of the vehicle body components relative to the frame component; a component configured to collect data representing an external environment of the vehicle; and one or more processors configured to detect, by processing the data, an external driving condition, wherein the external driving condition is an impending collision between the vehicle and one or more objects external to the vehicle, and when the external driving condition is detected, cause the actuator components to correspondingly adjust the physical configurations of the vehicle body components.

18 Claims, 12 Drawing Sheets

(51) Int. Cl.
   *B60R 21/0134* (2006.01)
   *B60W 30/08* (2012.01)
   *B60W 30/095* (2012.01)
   *B60R 21/01* (2006.01)

(52) U.S. Cl.
   CPC .......... *B60W 30/08* (2013.01); *B60W 30/095* (2013.01); *B60W 30/0953* (2013.01); *B60W 30/0956* (2013.01); *B60R 2019/005* (2013.01); *B60R 2019/007* (2013.01); *B60R 2021/0104* (2013.01); *B60R 2021/01013* (2013.01)

(58) Field of Classification Search
   CPC ......... B60R 2019/005; B60R 21/0136; B60W 30/09; B60W 30/08; B60W 30/0953; B60W 30/095; B60W 30/0956; B60W 50/0098; G08G 1/16
   See application file for complete search history.

(56) References Cited

U.S. PATENT DOCUMENTS

| | | | |
|---|---|---|---|
| 4,518,183 | A | 5/1985 | Lee |
| 4,836,080 | A | 6/1989 | Kite, III et al. |
| 5,570,903 | A | 11/1996 | Meister et al. |
| 5,748,477 | A | 5/1998 | Katoh |
| 5,785,347 | A | 7/1998 | Adolph et al. |
| 5,975,231 | A | 11/1999 | Hirato |
| 6,026,340 | A | 2/2000 | Corrado et al. |
| 6,490,515 | B1 | 12/2002 | Okamura et al. |
| 7,158,016 | B2 | 1/2007 | Cuddihy et al. |
| 7,798,275 | B2 | 9/2010 | Fehring et al. |
| 8,157,045 | B2 | 4/2012 | Hashimoto et al. |
| 8,260,502 | B2 | 9/2012 | Yonak et al. |
| 8,949,153 | B2* | 2/2015 | Holmes ................ B60R 19/023 280/736 |
| 9,199,563 | B2 | 12/2015 | Howard et al. |
| 9,663,052 | B2 | 5/2017 | Rao et al. |
| 9,886,841 | B1 | 2/2018 | Nave et al. |
| 10,300,832 | B1 | 5/2019 | Folks et al. |
| 10,324,463 | B1 | 6/2019 | Konrardy et al. |
| 10,437,232 | B2 | 10/2019 | Langer et al. |
| 11,046,266 | B1* | 6/2021 | Christensen ........ B60W 30/095 |
| 2002/0003345 | A1 | 1/2002 | Stanley et al. |
| 2002/0188393 | A1 | 12/2002 | Yokota et al. |
| 2004/0002815 | A1* | 1/2004 | Ishizaki ............... B60R 21/0136 701/96 |
| 2004/0049331 | A1 | 3/2004 | Schneider |
| 2004/0107033 | A1 | 6/2004 | Rao et al. |
| 2005/0069839 | A1 | 3/2005 | Denne |
| 2005/0082851 | A1 | 4/2005 | Nakanishi |
| 2005/0131606 | A1 | 6/2005 | Motozawa et al. |
| 2005/0240329 | A1 | 10/2005 | Hirota |
| 2006/0186702 | A1 | 8/2006 | Kisanuki et al. |
| 2007/0083311 | A1 | 4/2007 | Tabe |
| 2007/0223910 | A1 | 9/2007 | Aoki et al. |
| 2008/0040004 | A1 | 2/2008 | Breed |
| 2008/0162002 | A1 | 7/2008 | Bacher et al. |
| 2009/0143943 | A1 | 6/2009 | Jaramillo et al. |
| 2009/0152041 | A1 | 6/2009 | Kim |
| 2009/0152880 | A1 | 6/2009 | Donovan |
| 2009/0242308 | A1 | 10/2009 | Kitte et al. |
| 2009/0326766 | A1 | 12/2009 | Wang |
| 2010/0066116 | A1 | 3/2010 | Coenen |
| 2011/0140404 | A1 | 6/2011 | Odate |
| 2011/0172882 | A1* | 7/2011 | Schrader ................ B60R 19/54 293/118 |
| 2011/0221247 | A1 | 9/2011 | Hashimoto et al. |
| 2011/0295467 | A1 | 12/2011 | Browne et al. |
| 2012/0166229 | A1 | 6/2012 | Collins et al. |
| 2012/0215403 | A1 | 8/2012 | Tengler et al. |
| 2014/0135598 | A1 | 5/2014 | Weidl et al. |
| 2014/0309790 | A1 | 10/2014 | Ricci |
| 2014/0339391 | A1 | 11/2014 | Hsu et al. |
| 2015/0101877 | A1* | 4/2015 | Ohmura ................ B60R 21/206 180/274 |
| 2015/0224845 | A1 | 8/2015 | Anderson et al. |
| 2016/0277911 | A1 | 9/2016 | Kang et al. |
| 2016/0297430 | A1 | 10/2016 | Jones et al. |
| 2017/0182970 | A1 | 6/2017 | Wu |
| 2017/0313208 | A1 | 11/2017 | Lindsay |
| 2018/0094966 | A1 | 4/2018 | Buether |
| 2018/0164119 | A1 | 6/2018 | Becker |
| 2018/0272977 | A1 | 9/2018 | Szawarski et al. |
| 2018/0281625 | A1 | 10/2018 | Akaba et al. |
| 2018/0368191 | A1 | 12/2018 | Vutukuri et al. |
| 2019/0023209 | A1 | 1/2019 | Freienstein et al. |
| 2019/0096256 | A1 | 3/2019 | Rowell |

* cited by examiner

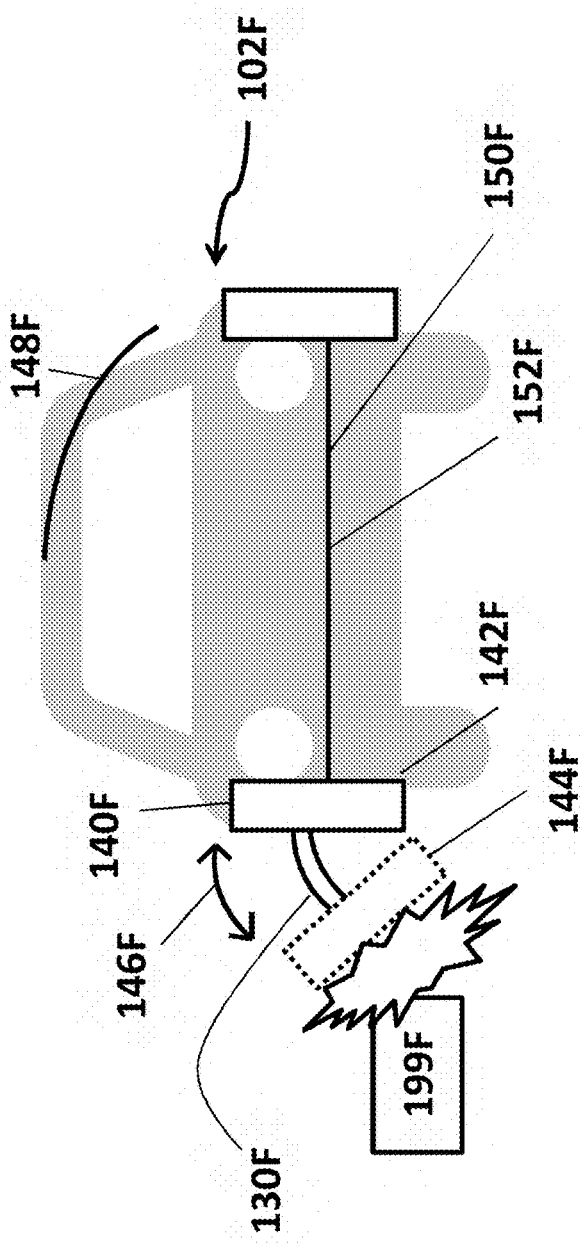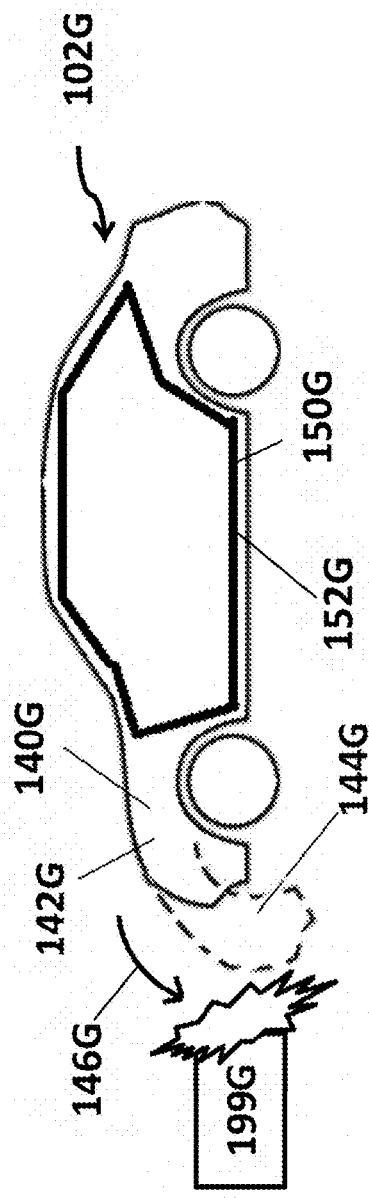

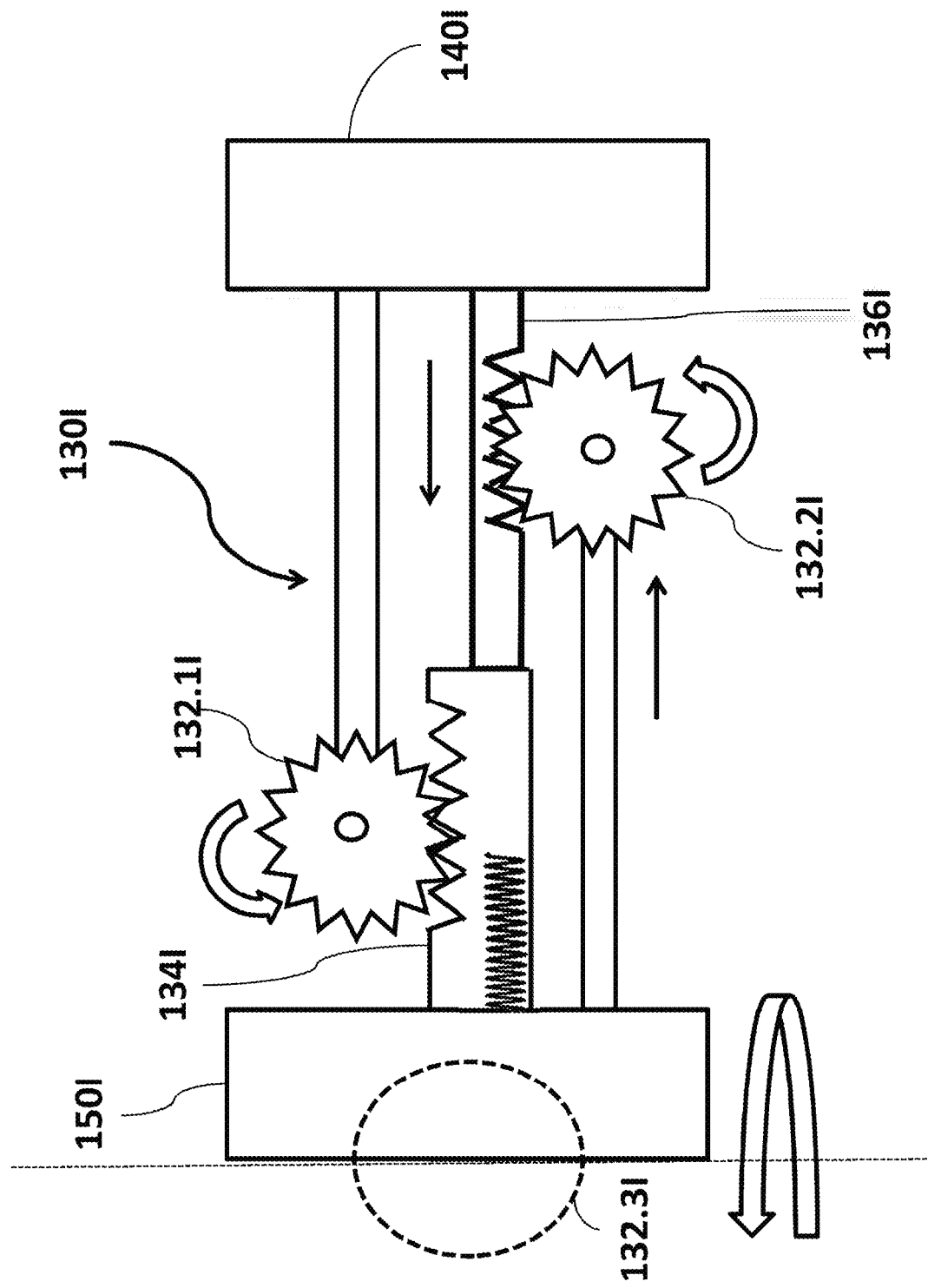

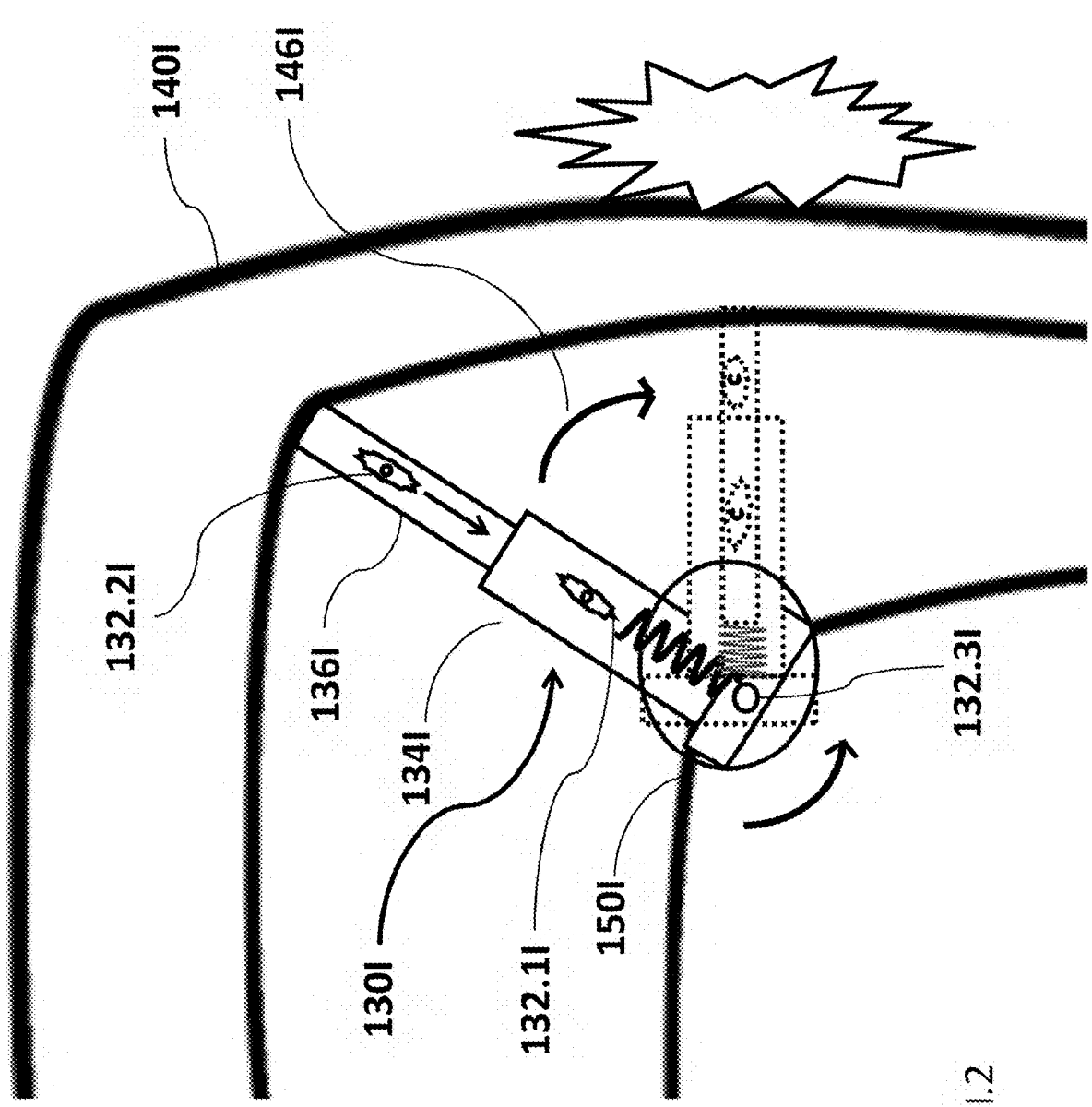
Figure 21.2

SYSTEM AND METHOD FOR DAMPENING IMPACT TO A VEHICLE

RELATED APPLICATION

This application is a continuation of U.S. patent application Ser. No. 15/996,763, which was filed on Jun. 4, 2018. U.S. patent application Ser. No. 15/996,763 is hereby incorporated herein by reference in its entirety.

FIELD OF DISCLOSURE

The present disclosure generally relates to vehicle safety. More particularly, the present invention disclosure relates to systems and methods for modifying and controlling the physical structure of a vehicle, in response to detecting an external driving condition, for the purpose of improving vehicle passenger safety and reducing injury risk.

BACKGROUND

While exterior vehicle aesthetics have changed over time and vary amongst manufacturers, the general physical structure and functionality of the exterior portion of vehicles has remained virtually the same. Conventional vehicle structures and frames were adapted so that a human could effectively, safely, and manually, operate a vehicle. Further, the structure of vehicles was designed to house and support heavy and complex machinery while also keeping vehicle passengers safe. Accordingly, existing physical vehicle structures are confined to certain configurations and materials to accommodate these requirements. For instance, space must be devoted to the engine, cargo, steering wheel, brake, accelerator, and gear shifter, and the driver must be positioned to accessibly operate this equipment while having a clear view of the road and traffic in all directions. With existing vehicles, an end user must often choose what characteristic (e.g., safety, performance, passenger seating, cargo room, ability to traverse specific weather conditions, etc.) is of chief importance when deciding on an automobile to operate. Moreover, improving the safety features of a vehicle comes at the expense of vehicle aesthetics, performance, and/or passenger amenities.

Existing vehicle safety technology has been limited in form and/or function in order to also conform to existing configurations. Each year millions of individuals are injured as a result of vehicular accidents emanating from operator error, inattention, inexperience, misuse, or distraction; inclement weather conditions; treacherous road conditions; and other driving environment conditions. The physical structure of existing vehicles is limited by the need to accommodate passengers and functional equipment to operate the vehicle, however, vehicle safety technology is often directed primarily towards, and incorporated within, the interior space of the vehicle. Therefore, a vehicle occupant is limited to specific vehicle safety devices (e.g., seatbelts, airbags, etc.) regardless of the vehicle's actions and/or driving conditions external to the vehicle. Additionally, many of these technologies, such as airbags, do not deploy until after a vehicle has already been involved in a collision. Similarly, other existing vehicle safety technologies, such as seatbelts, can only perform a single function and provide limited or no benefit in certain situations. In some instances, the existing safety technology installed in a vehicle can cause more harm than it prevents because of the specific type of accident and/or the physical attributes of the vehicle's passenger. A passenger's specific body position during a collision can affect how his/her body is impacted by the collision, and just a few inches or degrees of difference in body positioning can be the difference between a passenger walking away from a collision alive and unscathed, as opposed to life-altering injuries or death. However, given the near-instantaneous nature of most accidents, it is almost impossible for a driver or passenger to brace for impact or make changes to his/her position to reduce a risk of injury. Even if a passenger was somehow able to foresee an impending accident, his/her physical movement would be limited due to the existing and confined standard interior vehicle configurations. Additionally, it would often be impossible for a human passenger to determine, especially in an instant, what precise movements needed to be made to avoid/reduce injury, make such movements, and/or verify such movements had been accurately taken.

The increase in autonomous and semi-autonomous vehicles has decreased the need for vehicles to be operated by humans. Autonomous and semi-autonomous vehicles augment vehicle operators' information or replace vehicle operators' control commands to operate the vehicle, in whole or part, with computer systems based upon information collected by equipment within, or attached to, the vehicle. Consequently, there is a decreased need for vehicles to be confined to features and configurations, such as the physical structure, specifically designed to accommodate human-operated vehicles.

SUMMARY

The present application disclosure provides a system and method for dampening impact to a vehicle by adjusting the physical configuration of an adjustable exterior vehicle body component of a vehicle in response to detecting an external driving condition.

In one embodiment, a system for dampening impact to a vehicle includes a vehicle frame component, a plurality of adjustable exterior vehicle body components coupled to the vehicle frame component, wherein the vehicle body components are on different sides of a vehicle and are configurable to dampen an external force exerted on the vehicle, and a plurality of actuator components configured to adjust physical configurations of the vehicle body components relative to the vehicle frame component. The system also includes a component configured to collect driving environment data representing an external environment of the vehicle, and one or more processors configured to detect, by processing the driving environment data, an external driving condition, wherein the external driving condition is an impending collision between the vehicle and one or more objects external to the vehicle. The one or more processors are also configured to, when the external driving condition is detected, cause the actuator components to correspondingly adjust the physical configurations of the vehicle body components.

In one embodiment, a method for dampening impact to a vehicle includes receiving, via one or more processors, data representing an external environment of a vehicle; detecting, by processing the data using the one or more processors, an impending collision between the vehicle and one or more objects external to the vehicle; and causing, via a plurality of actuator components, a plurality of adjustable exterior vehicle body components to correspondingly adjust physical configurations of the vehicle body components relative to a vehicle frame component to dampen an external force on the vehicle when the impending collision is detected, wherein the plurality of body components are on different sides of the vehicle.

In one embodiment, a system for dampening impact to a vehicle includes an adjustable exterior vehicle component configured to dampen an external force exerted on the vehicle, a vehicle frame component configured to couple to the adjustable exterior vehicle component, an actuator component configured to adjust a physical configuration of the adjustable exterior vehicle component, and an external communication component configured to collect data representing an external environment of the vehicle. The system also includes one or more processors configured to receive driving environment data. The driving environment data includes, or is derived from data that includes, the data collected by the external communication component. The one or more processors are also configured to detect, by processing the driving environment data, an external driving condition, and, when the one or more processors detect the external driving condition, cause the actuator component to adjust the adjustable exterior vehicle component to a specific physical configuration.

In one embodiment, a method for dampening impact to a vehicle comprises receiving, via one or more processors, driving environment data; detecting, via the one or more processors, an external driving condition based on the received driving environment data; and causing, via an actuator component, an adjustable exterior vehicle component to adjust to a specific physical configuration when the one or more processors detect the external driving condition.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

FIG. 2F illustrates a sixth embodiment and scenario in which an adjustable exterior vehicle component may be adjusted from a first physical configuration to a second physical configuration.

FIG. 2G illustrates a seventh embodiment and scenario in which an adjustable exterior vehicle component may be adjusted from a first physical configuration to a second physical configuration.

FIGS. 2I.1 and 2I.2 illustrate top and side views, respectively, of a second embodiment of an actuator component configured to adjust the physical configuration of an adjustable exterior vehicle component.

DETAILED DESCRIPTION

The embodiments described herein relate to, inter alia, systems and methods for adjusting the physical configuration of one or more adjustable exterior vehicle body components of a vehicle in response to detecting an external driving condition affecting the vehicle.

Figure 1A:
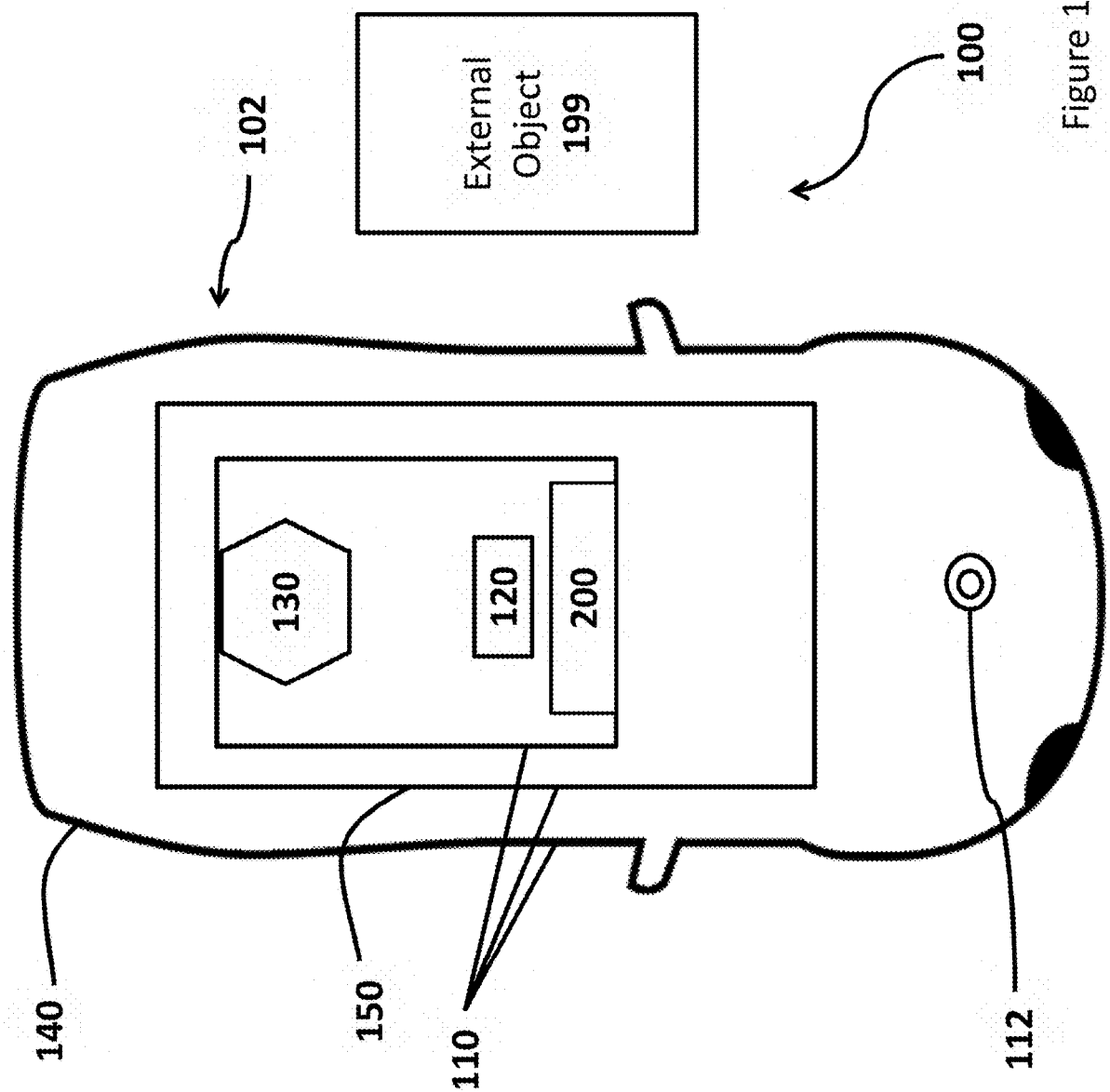
FIG. 1A depicts a block diagram of a first embodiment of a system for controlling an adjustable exterior vehicle component.

FIG. 1A depicts a block diagram of a first embodiment of a system 100 for controlling an adjustable exterior vehicle component. The system 100 includes a vehicle 102, vehicle-based components 110, and one or more objects external to the vehicle 199 (hereinafter "external object 199"). The vehicle-based components 110 may include an external communication component 112, a vehicle computer 200, an interior data collection component 120, an actuator component 130, an adjustable exterior vehicle body component 140, and a vehicle frame component 150. In operation, data relating to a vehicle's surrounding environment and/or operation is collected and transmitted to the vehicle computer 200. The vehicle computer 200 analyzes this data to detect an external driving condition. When the vehicle computer 200 detects the external driving condition, the vehicle computer 200 causes the actuator component 130 to adjust the physical configuration of the adjustable exterior vehicle body component 140, relative to the vehicle frame component 150, from a first physical configuration to a second physical configuration.

Although the system 100 is shown in FIG. 1A to include one vehicle 102, one external communication component 112, one interior data collection component 120, one actuator component 130, one adjustable exterior vehicle body component 140, one vehicle frame component 150, one external object 199, and one vehicle computer 200, it should be understood that different numbers of each may be utilized. For example, the system 100 may include a plurality of external communication components 112, all of which may be coupled to the vehicle 102 and in communication with the vehicle computer 200. Furthermore, the storage or processing performed by the vehicle 200 may be distributed among a plurality of computers comprising a network.

The vehicle 102 may be an automobile, bus, boat, airplane, train, helicopter, tractor, forklift, or other machine employed by a user to travel, and may be an autonomous vehicle, a semi-autonomous vehicle, or a fully manual vehicle.

The external communication component 112 is configured to collect driving environment data representative of an external environment of the vehicle 102. An external environment is the physical environment and/or space outside of the vehicle 102. The external communication component 112 may be affixed on, to, and/or in the vehicle 102. The external communication component 112 may include one or more of transceivers, GPS units, sensors (e.g., a radar unit, LIDAR unit, motion sensor, ultrasonic sensor, infrared sensor, inductance sensor, camera, microphone, etc.), and/or any other suitable piece(s) of equipment configured to collect data representative of the external environment to the vehicle 102. In some embodiments where the external communication component 112 includes a transceiver, driving environment data may be received using wireless communication technology, such as Bluetooth, Wi-Fi, dedicated short-range communications (DSRC), or other existing or later-developed communications protocols. For those embodiments in which the external communication component 112 includes a sensor, the external communication component 112 may actively or passively scan the external environment of the vehicle for one or more external objects 199.

In some embodiments, the external communication component 112 is a microphone configured to recognizing external audio input, commands, and/or sounds of windows breaking, air bags deploying, tires skidding, conversations or voices of other drivers and/or pedestrians, music, rain, snow, or wind noise, and/or other sounds heard external to the vehicle 102 that may enable the processor 202 to detect an external driving condition.

Examples of the external object 199 include, but are not limited to, one or more other vehicles, buildings, pedestrians, overpasses, curbs, guardrails, concrete barrier, traffic signs, shrubbery, structures, animals, and/or any other physical element that could come into physical contact with the vehicle 102 and be involved in an accident/crash/collision. In some embodiments, the external communication component 112 may collect data for determining the location, position, movement, speed, route, destination, and/or trajectory of external object 199. The external communication component 112 may also be configured to collect, receive, transmit, and/or generate data relating to current, future, and/or past driving conditions, past/typical driving behavior of a nearby vehicle, the external object 199, and/or the environment external to the vehicle 102. Data collected, received, or generated by the external communication component 112 may be transmitted to the vehicle computer 200, or a component of the vehicle computer 200.

In some embodiments, the external communication component 112 may include a transceiver configured to receive third party driving environment data from the external object 199, a server, a network, an infrastructure component, and/or another source. The infrastructure components may include smart infrastructure or devices (e.g., sensors, transmitters, etc.) disposed within or communicatively connected to buildings, transportation or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other infrastructure system components. Examples of other sources that may transmit driving environment data to the external communication component 112 include mobile devices (e.g. smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, and/or other computing devices); smart vehicles; dash or vehicle mounted systems or original telematics devices; buildings; pedestrians; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication. In some embodiments, the driving environment data collected may be derived from police or fire departments, hospitals, and/or emergency responder communications; police reports; municipality information; automated Freedom of Information Act requests; and/or other data collected from government agencies and officials.

In some embodiments, if a driver has expressly agreed to participate in a program involving data collection/sharing, the external communication component 112 may also transmit the collected driving environment data to a third party receiver, database, server, infrastructure component, and/or network. In some embodiments, the collected driving environment data may be used to adjust, generate, and/or update an insurance policy, premium, rate, discount, and/or reward for the specific driver, passenger, and/or the insured individual. The external communication component 112 may be originally installed by a manufacturer of the vehicle 102, or installed as an aftermarket modification or addition to the vehicle 102.

The external communication component 112 may include a clock configured to time-stamp the date and time that driving environment data is collected by the external communication component 112.

Figure 1B:
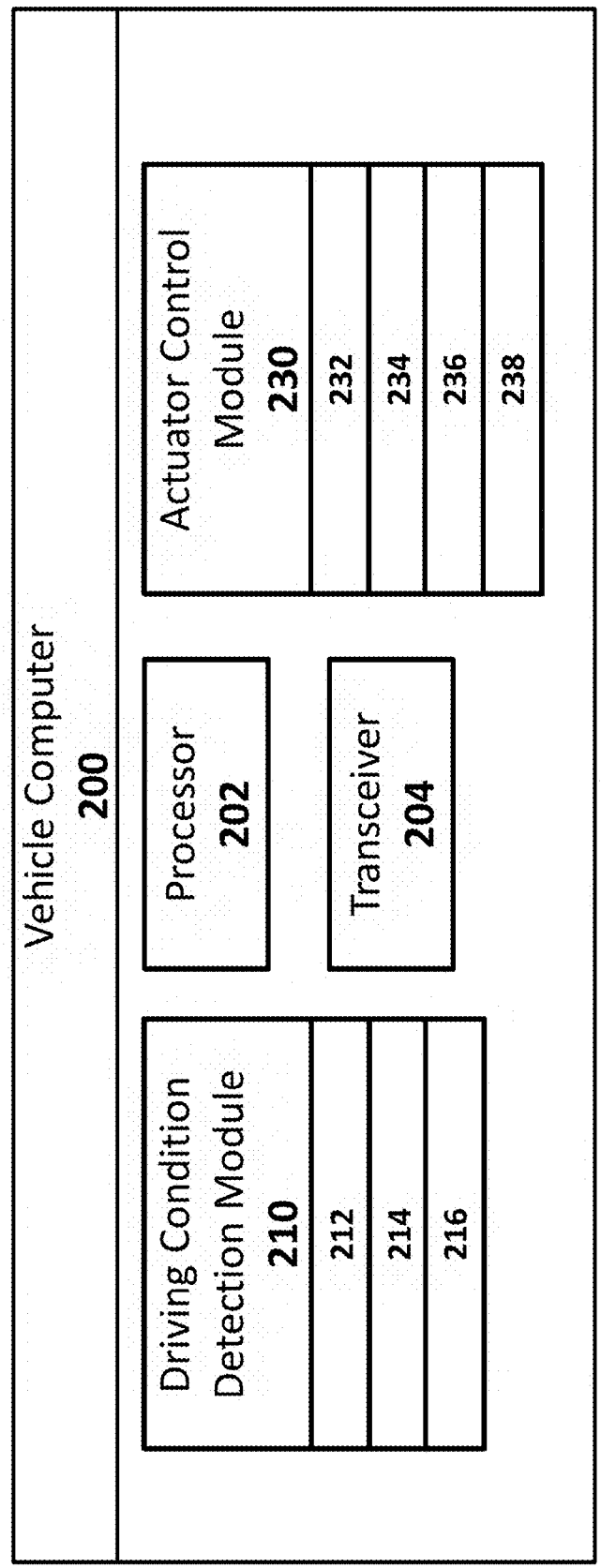
FIG. 1B is a detail block diagram of a vehicle computer that may be used in the system of FIG. 1A.

FIG. 1B depicts a detailed block diagram of the vehicle computer 200, according to one embodiment. The vehicle computer 200 is configured to receive, transmit, process, analyze, and/or detect data relating to the vehicle 102 and its environment, and monitor/control various features, functions, and components of the vehicle 102. The vehicle computer 200 may comprise one or more processors 202, a transceiver 204, a driving condition detection module 210, and an actuator control module 230. The vehicle computer 200 may be originally installed by a manufacturer of the vehicle 102, or installed as an aftermarket modification or addition to the vehicle 102. The vehicle computer 200 may be configured to be in communication with the external communication component 112, the interior data collection component 120, and/or the actuator component 130 of FIG. 1A. The transceiver 204 is configured to receive and transmit data, and may be designed to send and receive information/data according to predetermined specifications, such as a dedicated short-range communication (DSRC) channel, wireless telephony, Wi-Fi, or other existing or later-developed communications protocols. The vehicle computer 200 may include a user interface for a passenger to view, enter, and/or select information pertaining to his/herself, another passenger, the vehicle 102, and/or the environment external to vehicle 102.

The vehicle computer 200 may further include a number of software applications stored in in the program memory of the driving condition detection module 210 and/or the actuator control module 230. In some embodiments the aforementioned modules may all be stored as software modules within the same program memory. The various software applications on the vehicle computer 200 may include specific programs, routines, or scripts for performing processing functions associated with the methods and functions described herein. Additionally, the various software applications on the vehicle computer 200 may include general-purpose software applications for data processing, database management, data analysis, network communication, web server operation, or other functions described herein or typically performed by a server. The various software applications may be executed on the same processor 202 or on different processors. Additionally, or alternatively, the software applications may interact with various hardware modules that may be installed within or connected to the vehicle 200. Such modules may implement part of all of the various exemplary methods discussed herein or other related embodiments. The memory units discussed herein may include one or more types of memory, including volatile memory (e.g., DRAM, SRAM, etc.), non-volatile memory (ROM, EEPROM, etc.), and/or secondary storage (e.g., hard drive, solid state, etc.).

The driving condition detection module 210 is configured to receive, store, and analyze the driving environment data to determine whether an external driving condition has been detected. Examples of an external driving condition which the processor 202 may be configured to detect include, but are not limited to, an impending automobile accident and/or any other condition that may pose a risk to, or change the nature of the risk to, the operation of the vehicle 102 and/or the safety of a passenger riding in the vehicle 102. The driving condition detection module 210 may include a driving environment data storage 212, an external driving condition detection program memory 214, and an external driving condition detection criteria data storage 216. The driving environment data storage 212 is configured to store the driving environment data received, via the transceiver 204, from the external communication component 112. The driving condition detection program memory 214 stores program instructions for detecting one or more external driving conditions based on the driving environment data collected by the external communication component 112. The external driving condition detection program may comprise one or more algorithms, machine learning techniques, data comparison, and/or other techniques for detecting an external driving condition based on the driving environment data. In some embodiments, external driving conditions may be detected based on criteria data stored in the external driving condition detection criteria data storage 216, indicative of a threshold and/or other criteria defining when a particular external driving condition exists.

In analyzing the driving environment data to detect an external driving condition, the processor 202 may analyze historical accident information and/or test data involving vehicles having autonomous or semi-autonomous functionality. Factors that may be analyzed and/or accounted for by the processor 202 may include, but are not limited to, points of impact, vehicle type/style, vehicle behavior, vehicle speed, type of road, time of day, type/length of trip, level of pedestrian traffic, level of vehicle congestion, and/or other factors that could affect the likelihood of a crash. The processor 202 may weigh certain factors according to historical accident information, predicted accidents, vehicle trends, test data, and/or other considerations.

The actuator control module 230 is configured to determine a physical configuration for the adjustable exterior vehicle component 140 that may improve the safety of, prevent injury to, and/or to protect one or more passengers riding in/on the vehicle 102; and to cause the actuator component 130 to adjust the physical configuration of the adjustable exterior vehicle component 140 accordingly, in response to the external driving condition being detected. The actuator control module 230 may include an actuator program memory 232, an AEVC configuration data storage 234, an interior vehicle configuration data storage 236, and/or passenger profile data storage 238. The actuator program memory 232 may include program instructions that are executed to cause the actuator component 130 to move the adjustable exterior vehicle component 140. It should be appreciated that the term AEVC is an abbreviation for the term "adjustable exterior vehicle component."

Data corresponding to physical configurations of the adjustable exterior vehicle component 140 may be stored in the AEVC configuration data storage 234. For example, the AEVC configuration data storage 234 may contain data indicative of a default physical configuration, a current/initial physical configuration, a physical configuration set by a passenger or manufacturer, a range of physical configurations, and/or set of potential physical configurations to which adjustable exterior vehicle component 140 may be adjusted in response to detecting an external driving condition. In some embodiments, a sensor component may collect data representing the physical configuration of the adjustable exterior vehicle component 140 relative to the external environment of the vehicle 102, the vehicle frame component 150, and/or the external object 199. In some embodiments, the physical configuration of the adjustable exterior vehicle component 140 may be predetermined, determined in real-time, determined in response to interior vehicle configuration data stored in the interior vehicle configuration data storage 236, determined in response to passenger data stored in the passenger profile data storage 238, and/or determined in response to the processor 202 detecting an external driving condition. In some embodiments, the AEVC configuration data storage 234 may contain data indicative of a physical configuration of the adjustable exterior vehicle component 140 that minimizes the amount of impact/force/strain, resulting from a collision, felt by a passenger of the vehicle 102. Alternatively or additionally, the physical configuration may be one that dampens/absorbs the maximum amount of impact/force/strain, resulting from a collision, exerted on the vehicle 102.

In determining a physical configuration of the adjustable exterior vehicle component 140, the processor 202 may take into account a passenger's preferences and/or characteristics/traits. The passenger profile data storage 238 may contain data indicative of one or more passenger's physical characteristics, biometric traits, pre-existing health conditions, mental health status, and/or any other physiological conditions. Examples of a passenger's preferences may include a passenger selected and/or preferred location, orientation, position, and/or configuration within the vehicle 102. Examples of passenger profile data include, but are not limited to, a passenger's height, weight, gender, age, education level, profession, disabilities/impairments/limitations, and/or pregnancy status. In some embodiments, passenger profile data is collected using the interior data collection component 120 and/or transmitted to the vehicle computer 200 from a third party device, server, network, or other remote database.

Referring now back to FIG. 1A, the interior data collection component 120 is configured to collect data indicative of an interior configuration of the vehicle 102 and/or data corresponding to one or more passengers inside the vehicle 102, and transmit the collected data to the vehicle computer 200, or a component of the vehicle computer 200 (e.g., the interior vehicle configuration data storage 236). For example, the interior data collection component 120 may be configured to collect data representing the presence of one or more passengers/animals in the vehicle 102, and/or the location/position/orientation of the one or more passengers/animals (e.g., relative to the adjustable exterior vehicle component 140, vehicle frame component 150, etc.).

The interior data collection component 120 may also be configured to collect data indicative of the one or more passengers' physical characteristics, biometric traits, pre-existing health conditions, and/or any other physiological conditions. The interior data collection component 120 may include one or more sensors, such as an occupancy sensor, a motion sensor, a thermometer, a weight sensor, a pressure sensor, a biometric sensor, a camera, a microphone, and/or any other device equipped to collect data relating to any other measurable event or physical phenomenon within the vehicle 102. The interior data collection component 120 may comprise multiple components. The interior data collection component 120 may include a clock configured to time-stamp the date and time that data is collected by the interior data collection component 120. The interior data collection component 120 may be removably or fixedly installed within the vehicle 102 and may be disposed in various arrangements to collect passenger data. The interior data collection component 120 may be a mobile device, conducting electrode, and/or wearable device affixed to a passenger of the vehicle 102. The interior data collection component 120 may be housed within, under, and/or above the vehicle 102. The interior data collection component 120 may be in hardwired and/or wireless communication with the vehicle computer 200. The interior data collection component 120 may be designed to operate according to predetermined specifications, such as a dedicated short-range communication (DSRC) channel, wireless telephony, Wi-Fi, or other existing or later-developed communications protocols.

The actuator component 130 is configured to mechanically control movement of one or more mechanisms of the adjustable exterior vehicle component 140, relative to the vehicle frame component 150, in order to reduce the risk of injury to one or more vehicle passengers. The actuator component 130 may use electronic, pneumatic, hydraulic, thermal, and/or magnetic means to mechanically operate the adjustable exterior vehicle component 140. The actuator component 130 may adjust the entire adjustable exterior vehicle component 140 or a part, portion, or section of the adjustable exterior vehicle component 140. The actuator component 130 may be configured to receive a command, or a message/signal indicative of a command, from the actuator control module 230, to adjust the physical configuration of the adjustable exterior vehicle component 140 in response to the vehicle computer 200 detecting an external driving condition. In some embodiments, the actuator control module 230 generates an analog or digital power signal to control the actuator 130. The actuator component 130 may be configured to mechanically adjust the physical configuration, orientation, and/or position of the adjustable exterior vehicle component 140. The actuator component 130 may include, and/or be coupled to, a mechanical spring, rotary platform, polyurethane material, hydraulic fluid system, telescoping apparatus, piston strut, shock absorber and/or other component/device configured to dampen/absorb/reduce/lessen/diminish a force exerted on the vehicle 102.

Examples of adjusting the physical configuration, orientation, or position of the adjustable exterior vehicle component 140 include, but are not limited to, adjusting the yaw angle, pitch angle, and/or roll angle of the adjustable exterior vehicle component 140. Other examples of adjusting the physical configuration, orientation, and/or position include, but are not limited to, moving the adjustable exterior vehicle component 140 in at least one of a forward, backward, upward, downward, clockwise, counterclockwise, or lateral direction relative to the vehicle frame component 150. For example, in response to detecting the vehicle 102 is going to be in a head-on collision, the actuator component 130 may rotate the adjustable exterior vehicle component 140 to absorb as much of the impact generated by the collision as possible. In this manner, adjusting the physical configuration of the adjustable exterior vehicle component 140 may reduce the risk of a passenger experiencing whiplash and/or broken bones, tissue damage, and/or another injury caused by the collision.

Examples of the actuator component 130 include, but are not limited to, a gear system, motor, a coupling component, and/or other device configured to move the adjustable exterior vehicle component 140, relative to the vehicle frame component 150, to improve the safety of a vehicle passenger. The actuator component 130 may be originally installed by a manufacturer of the vehicle 102, or installed as an aftermarket modification or addition to the vehicle 102. In some embodiments, the actuator component 130, or a component coupled to the actuator component 130, may physically couple the adjustable exterior vehicle component 140 and the vehicle frame component 150. In some embodiments, a plurality of actuator components 130 may be used to adjust the physical configuration of the adjustable exterior vehicle component 140. Conversely, in some embodiments, the vehicle 102 may include a plurality of adjustable exterior vehicle components 140, and the physical configuration of each individual adjustable exterior vehicle component 140 may be adjusted by one or more respective actuator component(s) 130.

In some embodiments, the actuator component 130 may include a strut system with one or more legs of adjustable length. In such embodiments, when the processor 202 detects an impending collision between the vehicle 102 and an external object 199, for example, the strut actuator component(s) 130 may lengthen one or more of its legs and/or shorten some of its legs to adjust the physical configuration of the adjustable exterior vehicle component 140 in order to dampen the impact of the collision and prevent a passenger traveling in the vehicle 102 from sustaining an injury (such as hitting his/her head) caused by the collision.

The adjustable exterior vehicle component 140 is a physical element, unit, device, and/or apparatus affixed to, on, or in the vehicle 102. The adjustable exterior vehicle component 140 is configured to have its physical configuration adjusted by the actuator component 130 in response to the vehicle computer 200 detecting an external driving condition. The adjustable exterior vehicle component 140 may include, and/or be coupled to, a mechanical spring, rotary platform, polyurethane material, hydraulic fluid system, telescoping apparatus, piston strut, shock absorber and/or other component/device configured to dampen/absorb/reduce/lessen/diminish a force exerted on the vehicle 102. In some embodiments and/or scenarios, adjusting the physical configuration of the adjustable exterior vehicle component 140 to dampen the impact caused by an external vehicle condition (e.g., a collision) may reduce the risk of/prevent injury to one or more passengers of the vehicle 102.

The adjustable exterior vehicle component 140 may be originally installed by a manufacturer of the vehicle 102, installed as an aftermarket modification or addition to the vehicle 102. Examples of the adjustable exterior vehicle component 140 include, but are not limited to, a vehicle body, a vehicle shell, a vehicle shield, a bumper, an external airbag, an external surface, and/or other exterior element.

The adjustable exterior vehicle component 140 may be in a first physical configuration, orientation, or position prior to the vehicle computer 200 detecting an external driving condition. The external communication component 112 may collect data corresponding to the first physical configuration of the adjustable exterior vehicle component 140, before and/or during operation of the vehicle 102, so that the processor 202 has reference data from which to evaluate whether a passenger is at risk of sustaining an injury if an external condition is detected. The first physical configuration of the adjustable exterior vehicle component 140 may be set by a manufacturer, the vehicle computer 200 (or a component of the vehicle computer 200), or manually by an end user or passenger. The first physical configuration of the adjustable exterior vehicle component 140 may be set to a physical configuration that optimizes operation of the vehicle 102 (e.g., a more aerodynamic configuration). In response to the vehicle computer 200 detecting an external driving condition, the actuator component 130 may adjust/move the adjustable exterior vehicle component 140 to a second physical configuration in order to dampen the impact from the impending collision, and reduce the risk of injury to a passenger riding in the vehicle 102.

In some embodiments, the physical configuration of the adjustable exterior vehicle component 140 may not be adjusted in response to the processor 202 detecting an external driving condition, because the processor 202 determines that a passenger is not at risk of sustaining an injury, and/or that the current first physical configuration of the adjustable exterior vehicle component 140 is already in a physical configuration that will sufficiently dampen impact, and thus sufficiently reduces the risk of injury to a passenger riding in the vehicle 102. For example, in embodiments in which the processor 202 may determine that the vehicle 102 is going to collide with an external object, the current physical configuration of the adjustable exterior vehicle component 140 may nonetheless be maintained because the processor 202 has determined that adjustable exterior vehicle component 140 is already in the best physical configuration to protect a passenger, and/or adjusting the physical configuration of the adjustable exterior vehicle component 140 could increase the risk of injury to the passenger.

The vehicle frame component 150 is a physical element, unit, device, and/or apparatus contained within the vehicle 102. The vehicle frame component 150 is configured to have its physical configuration remain static relative to the adjustable exterior vehicle component 140. The vehicle frame component 150 may be a structural support, frame, enclosure, foundation, platform, reinforcement, and/or other piece(s) of equipment/system that houses the interior space of the vehicle 102 and/or physically supports the vehicle 102. The vehicle frame component 150 is configured to maintain the physical configuration of passengers traveling in the vehicle 102 while the physical configuration of the adjustable exterior vehicle component 140 is adjusted.

In one embodiment of the system 100, as depicted in FIG. 1A, prior to and/or during operation of the vehicle 102, a sensor component may collect data representing the physical configuration of the adjustable exterior vehicle component 140 relative to the external environment of the vehicle 102, the vehicle frame component 150, and/or the external object 199. The processor 202 may store this physical configuration data in the AEVC configuration data storage 234. Additionally, prior to and/or during the operation of the vehicle 102, the interior data collection component 120 may collect data indicative of a physical configuration of the interior space of the vehicle 102 and/or passenger data corresponding to a passenger riding in the vehicle 102. The processor 202 may store the interior space configuration data in the interior vehicle configuration data storage 236 and may store the passenger data in the passenger profile data storage 238. This data is collected so that the processor 202 has a reference point of pertinent information for assessing whether a passenger riding in the vehicle 102 is at risk of sustaining an injury while in the vehicle 102. Thereafter, the external communication component 112 collects driving environment data and transmits the driving environment data to the vehicle computer 200. The vehicle computer 200 receives the driving environment data via the transceiver 204, and the processor 202 stores the driving environment data in the driving environment data storage 212. After the driving environment data is collected, received, and stored in the driving environment data storage 212, the processor 202 executes an external driving condition detection program, stored in the external driving condition detection program memory 214, which is configured to analyze the driving environment data to determine whether a hazardous external driving condition exists.

When the processor 202 detects the external driving condition, the processor 202 executes an actuator program stored in the actuator program memory 232 to cause the actuator component 130 to adjust the physical configuration of the adjustable exterior vehicle component 140 from the first physical configuration to a second physical configuration, stored as AEVC physical configuration data in the AEVC configuration data storage 234. In response to detecting the external driving condition, the actuator component 130 then adjusts the adjustable exterior vehicle component 140 to the second physical configuration in order to dampen impact/force caused by the external driving condition. Dampening the impact/force caused by the external driving condition may reduce the risk of injury to, minimize injury to, and/or protect one or more passengers of the vehicle 102.

By way of a non-limiting example to demonstrate this embodiment of the system 100, a sensor (e.g., the external communication component 112) coupled to the vehicle 102 collects data (driving environment data) representing the position and speed of a vehicle (e.g., object 199) driving in close proximity to the vehicle 102. The sensor transmits this data to a processor 202 (within the vehicle computer 200), and the processor 202 detects, based on this data, whether the vehicle 102 and the nearby vehicle may collide by comparing, for example, the two vehicle's positions, speeds, and/or trajectories. When the processor 202 determines that the vehicle 102 and the nearby vehicle may collide, the processor 202 causes the actuator component 130 to adjust the physical configuration of an external vehicle body (e.g., the adjustable exterior vehicle component 140) from its current configuration (the "first" physical configuration) to a second physical configuration in order to prepare the vehicle 102 for impact, dampen the force caused by the collision, and reduce the risk of the passenger sustaining an injury resulting from the collision between the vehicle 102 and the other vehicle.

Figure 2A:
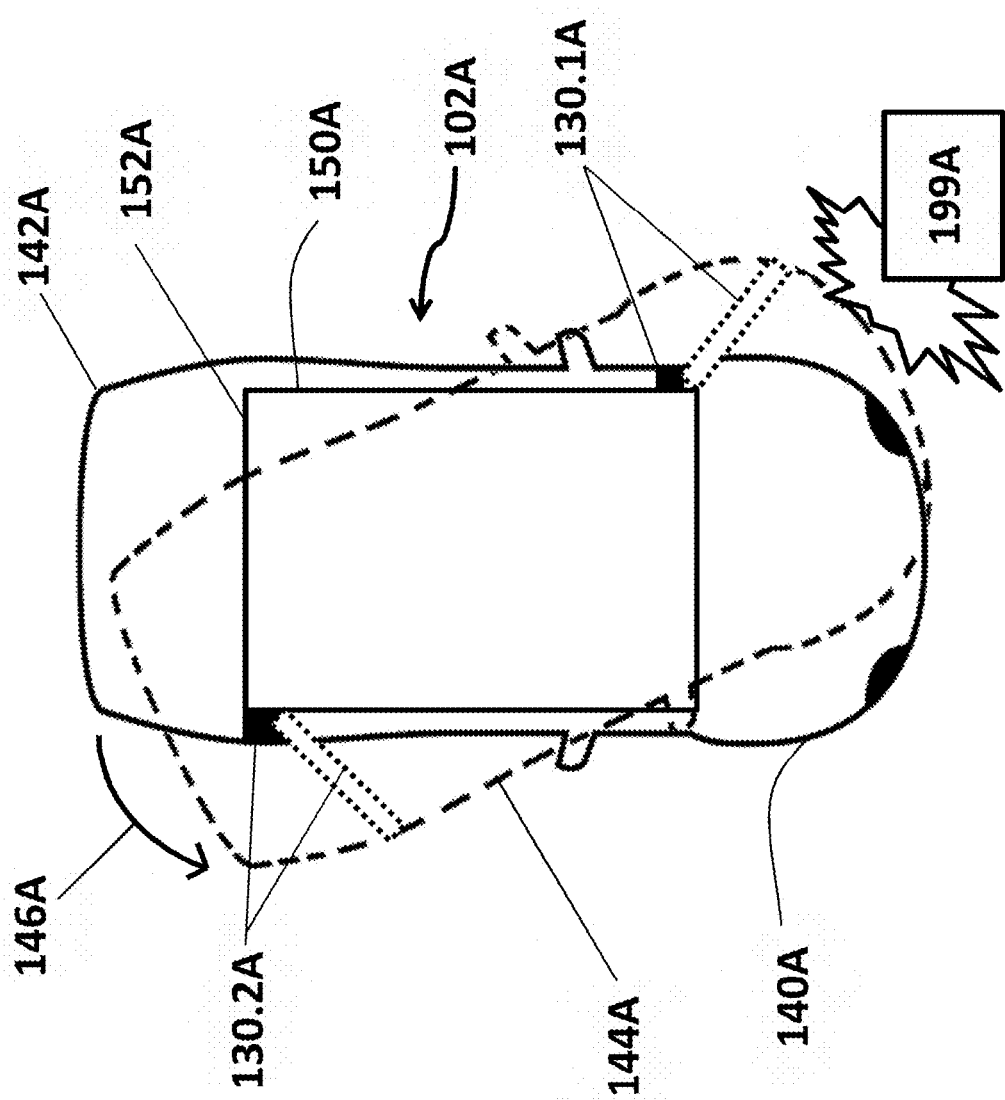
FIG. 2A illustrates a first embodiment and scenario in which an adjustable exterior vehicle component may be adjusted from a first physical configuration to a second physical configuration.

FIG. 2A illustrates a first embodiment and scenario in which an adjustable exterior vehicle component may be adjusted from a first physical configuration to a second physical configuration. As FIG. 2A illustrates, vehicle 102A comprises an adjustable exterior vehicle component 140A, a vehicle frame component 150A, a first actuator component 130.1A, and a second actuator component 130.2A. The adjustable exterior vehicle component 140A is disposed in a first physical configuration 142A external to the vehicle frame component 150A. Each of the first actuator component 130.1A and the second actuator component 130.2A is configured to physically couple the adjustable exterior vehicle component 140A and the vehicle frame component 150A, and to adjust the physical configuration of the adjustable exterior vehicle component 140A. In this embodiment, the first actuator component 130.1A and the second actuator component 130.2A may include, or be coupled to, a gear system, a mechanical spring, rotary platform, telescoping apparatus, piston strut, shock absorber, and/or other device configured to adjust the physical configuration of the adjustable exterior vehicle component 140A. The vehicle frame component 150A is disposed in a physical configuration 152A. In this embodiment, the first actuator component 130.1 A and/or the second actuator component 130.2A rotates the adjustable exterior vehicle component 140A about a yaw angle 146A, relative to the vehicle frame component 150A, from the first physical configuration 142A to a second physical configuration 144A in response to the vehicle 102A computer determining that an external driving condition has been detected. The vehicle frame component 150A, however, remains static by maintaining the physical configuration 152A. For example, in a scenario in which a processor (e.g., the processor 202 of FIG. 1B) detects that the vehicle 102A is going to collide with a vehicle 199A approaching the front-left corner of the vehicle 102A, the processor may cause the actuator component 130A to rotate the physical configuration of the adjustable exterior vehicle component 140A from a current/initial physical configuration (here, the first physical configuration 142A) clockwise or counter-clockwise about a yaw angle to a new physical configuration (here, counter-clockwise to the second physical configuration 144A) to dampen/reduce the impact/force created by the impending collision between the vehicle 102A and the vehicle 199A. Dampening the impact caused by the impending collision may reduce the risk of/prevent injury to a passenger of the vehicle 102A.

Figure 2B:
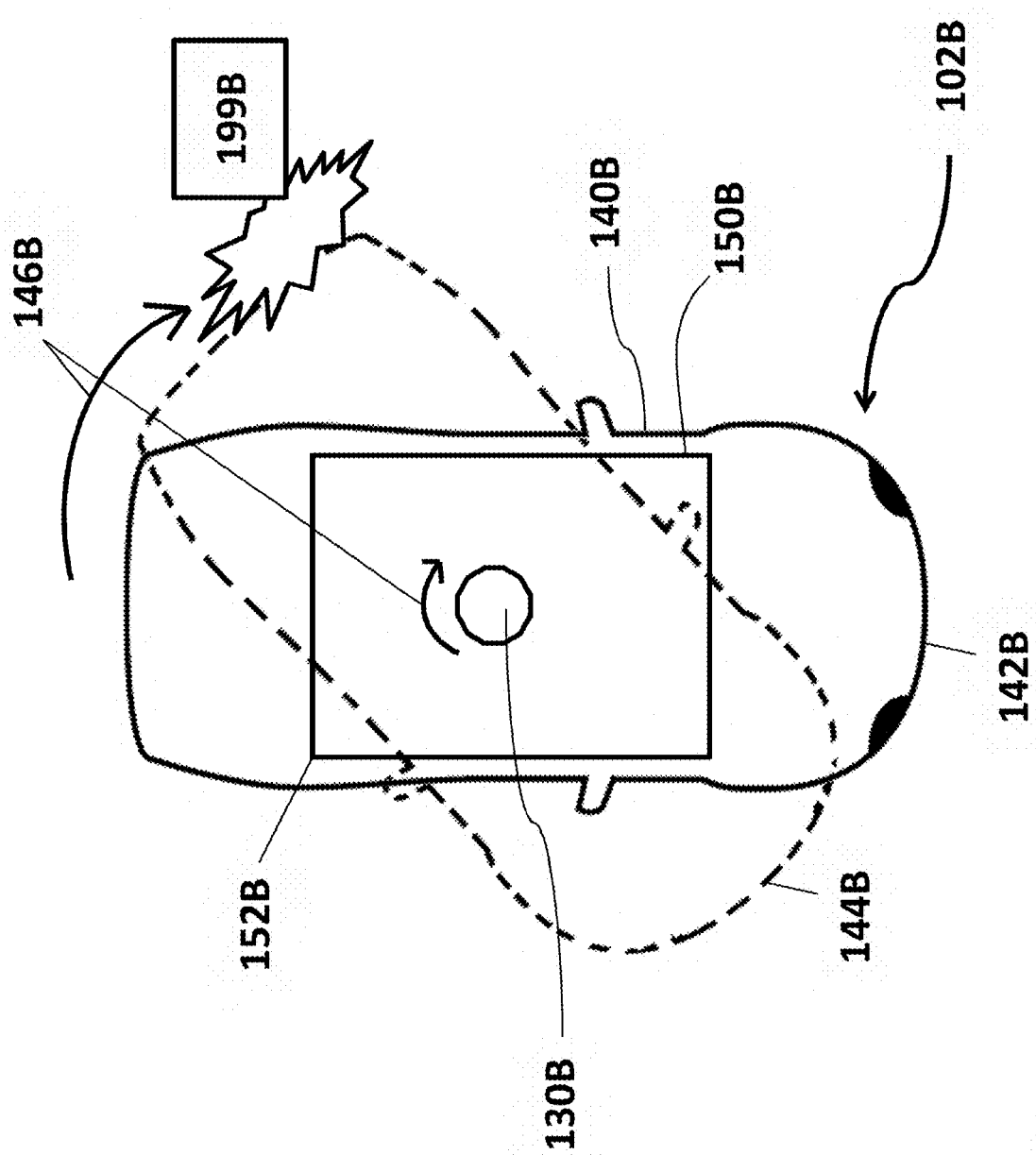
FIG. 2B illustrates a second embodiment and scenario in which an adjustable exterior vehicle component may be adjusted from a first physical configuration to a second physical configuration.

FIG. 2B illustrates a second embodiment and scenario in which an adjustable exterior vehicle component may be adjusted from a first physical configuration to a second physical configuration. As FIG. 2B illustrates, vehicle 102B comprises an adjustable exterior vehicle component 140B, a vehicle frame component 150B, and an actuator component 130B. The adjustable exterior vehicle component 140B is disposed in a first physical configuration 142B external to the vehicle frame component 150B. The actuator component 130B is configured to physically couple the adjustable exterior vehicle component 140B and the vehicle frame component 150B, and to adjust the physical configuration of the adjustable exterior vehicle component 140B. In this embodiment, the actuator component 130B may include, or be coupled to, a gear system, a mechanical spring, rotary platform, telescoping apparatus, piston strut, shock absorber, and/or other device configured to adjust the physical configuration of the adjustable exterior vehicle component 140B. The vehicle frame component 150B is disposed in a physical configuration 152B. In this embodiment, the actuator component 130B rotates the adjustable exterior vehicle component 140B about a yaw angle 146B, relative to the vehicle frame component 150B, from the first physical configuration 142B to a second physical configuration 144B in response to the vehicle 102B computer determining that an external driving condition has been detected. The vehicle frame component 150B, however, remains static by maintaining the physical configuration 152B. For example, in a scenario in which a processor (e.g., the processor 202 of FIG. 1B) detects that the vehicle 102B is going to collide with a vehicle 199B approaching the back-left corner of the vehicle 102B, the processor may cause the actuator component 130B to rotate the physical configuration of the adjustable exterior vehicle component 140B from a current/initial physical configuration (here, the first physical configuration 142B) clockwise or counter-clockwise about a yaw angle to a new physical configuration (here, clockwise to the second physical configuration 144B) to dampen/reduce the impact/force created by the impending collision between the vehicle 102B and the vehicle 199B. Dampening the impact caused by the impending collision may reduce the risk of/prevent injury to a passenger of the vehicle 102B.

Figure 2C:
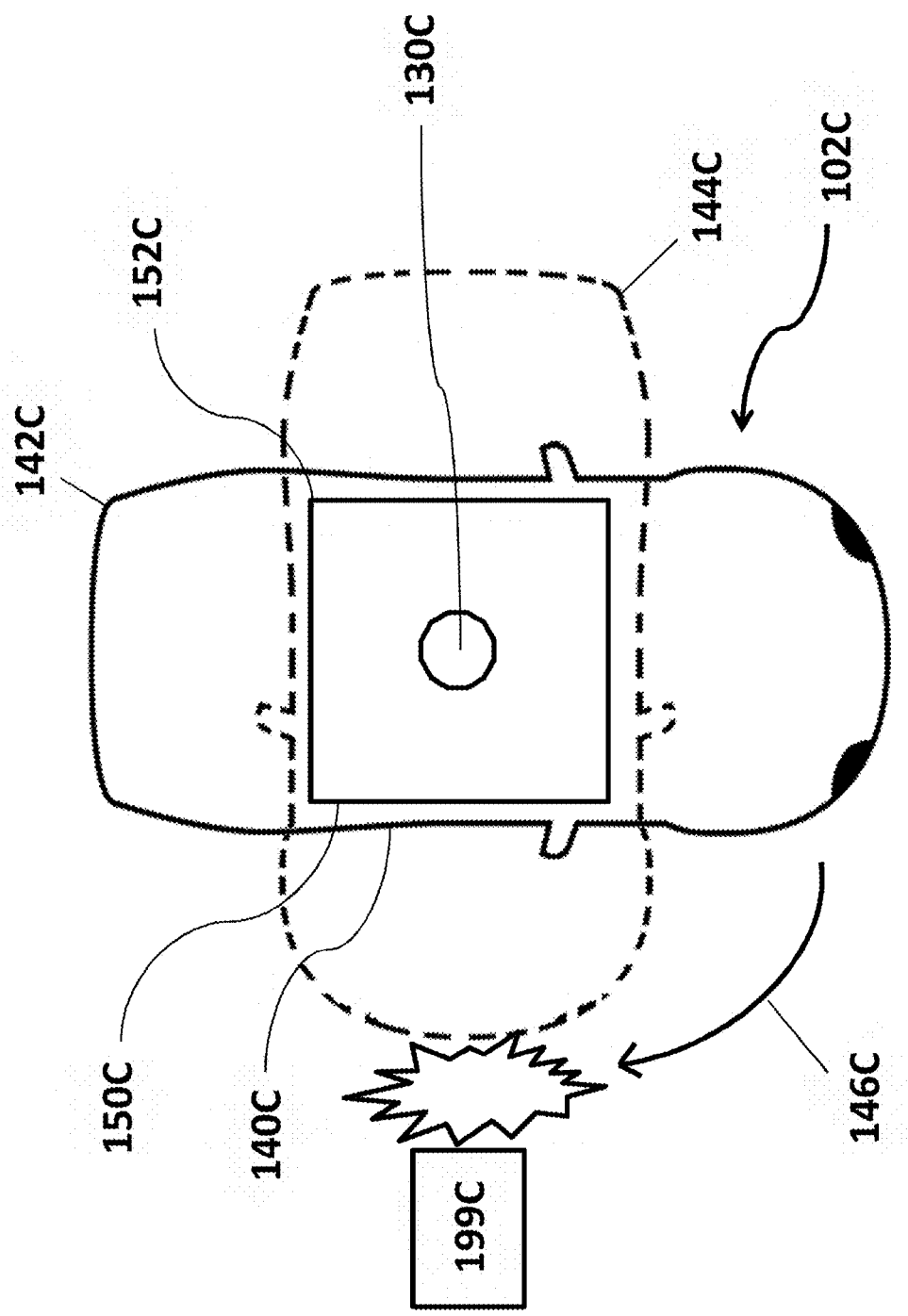
FIG. 2C illustrates a third embodiment and scenario in which an adjustable exterior vehicle component may be adjusted from a first physical configuration to a second physical configuration.

FIG. 2C illustrates a third embodiment and scenario in which an adjustable exterior vehicle component may be adjusted from a first physical configuration to a second physical configuration. FIG. 2C may represent the same embodiment shown in FIG. 2B, for example, but in a scenario where the other vehicle approaches from a different direction. As FIG. 2C illustrates, vehicle 102C comprises an adjustable exterior vehicle component 140C, a vehicle frame component 150C, and an actuator component 130C. The adjustable exterior vehicle component 140C is disposed in a first physical configuration 142C external to the vehicle frame component 150C. The actuator component 130C is configured to physically couple the adjustable exterior vehicle component 140C and the vehicle frame component 150C, and to adjust the physical configuration of the adjustable exterior vehicle component 140C. In this embodiment, the actuator component 130C may include, or be coupled to, a gear system, a mechanical spring, rotary platform, telescoping apparatus, piston strut, shock absorber, and/or other device configured to adjust the physical configuration of the adjustable exterior vehicle component 140C. The vehicle frame component 150C is disposed in a physical configuration 152C. In this embodiment, the actuator component 130C rotates the adjustable exterior vehicle component 140C about a yaw angle 146C, relative to the vehicle frame component 150C, from the first physical configuration 142C to a second physical configuration 144C in response to the vehicle 102C computer determining that an external driving condition has been detected. The vehicle frame component 150C, however, remains static by maintaining the physical configuration 152C. For example, in a scenario in which the processor detects that the vehicle 102C is going to be T-boned by an approaching vehicle 199C, the processor may cause the actuator component 130C to rotate the physical configuration of the adjustable exterior vehicle component 140C from a current/initial physical configuration (the first physical configuration 142C) by 90 degrees about a yaw axis to a new physical configuration (the second physical configuration 144C), to dampen/reduce the impact/force created by the impending collision between the vehicle 102C and the vehicle 199C. Dampening the impact caused by the impending side collision may reduce the risk of/prevent injury to a passenger of the vehicle 102C.

Figure 2D:
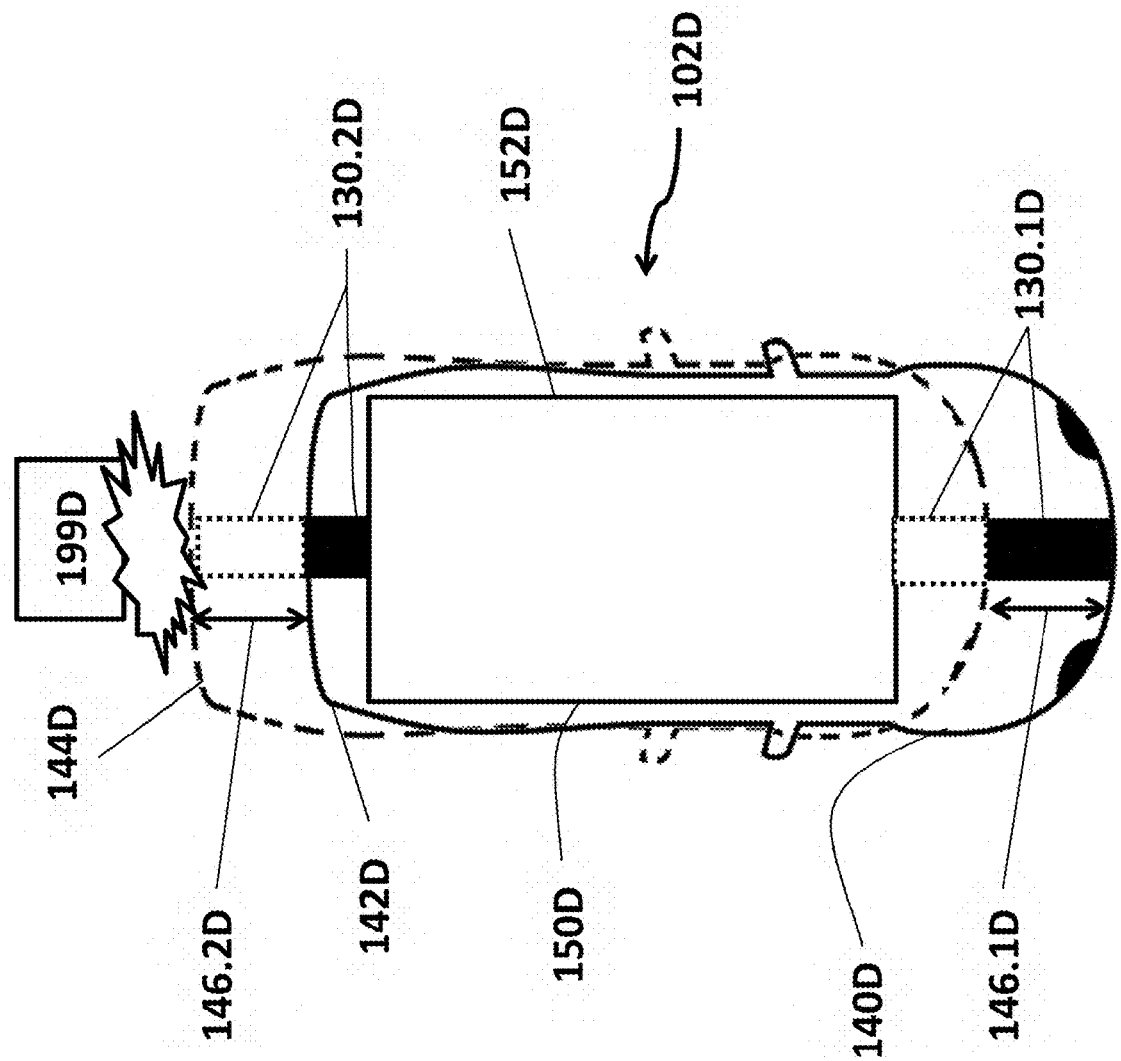
FIG. 2D illustrates a fourth embodiment and scenario in which an adjustable exterior vehicle component may be adjusted from a first physical configuration to a second physical configuration.

FIG. 2D illustrates a fourth embodiment and scenario in which an adjustable exterior vehicle component may be adjusted from a first physical configuration to a second physical configuration. As FIG. 2D illustrates, vehicle 102D comprises an adjustable exterior vehicle component 140D, a vehicle frame component 150D, a first actuator component 130.1D, and a second actuator component 130.2D. The adjustable exterior vehicle component 140D is disposed in a first physical configuration 142D external to the vehicle frame component 150D. Each of the first actuator component 130.1D and the second actuator component 130.2D is configured to physically couple the adjustable exterior vehicle component 140D and the vehicle frame component 150D, and to adjust the physical configuration of the adjustable exterior vehicle component 140D. In this embodiment, the first actuator component 130.1D and the second actuator component 130.2D may include, or be coupled to, a gear system, a mechanical spring, rotary platform, telescoping apparatus, piston strut, shock absorber, and/or other device configured to adjust the physical configuration of the adjustable exterior vehicle component 140D. The vehicle frame component 150D is disposed in a physical configuration 152D. In this embodiment, the first actuator component 130.1D and/or the second actuator component 130.2D adjust the adjustable exterior vehicle component 140D inward a length 146.1D and/or outward a length 146.2D, relative to the vehicle frame component 150D, from a first physical configuration 142D to a second physical configuration 144D in response to the vehicle computer determining that an external driving condition has been detected. The vehicle frame component 150D, however, remains static by maintaining the physical configuration 152D. For example, in a scenario in which a processor (e.g., the processor 202 of FIG. 1B) detects that the vehicle 102D is going to collide with a vehicle 199D, the processor may cause the actuator component to adjust the physical configuration of the adjustable exterior vehicle component from a current/initial physical configuration (the first physical configuration 142D) forwards/backwards to a new physical configuration (the second physical configuration 144D) in anticipation of the impending collision to dampen/reduce the impact/force when the collision occurs between the vehicle 102D and the vehicle 199D. Adjusting the physical configuration of the adjustable exterior vehicle component 140D prior to the collision may lessen the impact/force experienced by the vehicle frame 150D, or a component affixed to the vehicle frame 150D. Dampening the impact caused by the impending collision may reduce the risk of/prevent injury to a passenger of the vehicle 102D. It should be appreciated that the first actuator component 130.1D and the second actuator component 130.2D may be configured to extend outward and/or contract inwards, independently or in unison, in response to the processor detecting an external driving condition. It should also be appreciated that in some embodiments the first actuator component 130.1D and second actuator component 130.2D may be a single actuator component configured to move the physical configuration of the adjustable exterior vehicle component 140D in a backwards/forwards motion.

Figure 2E:
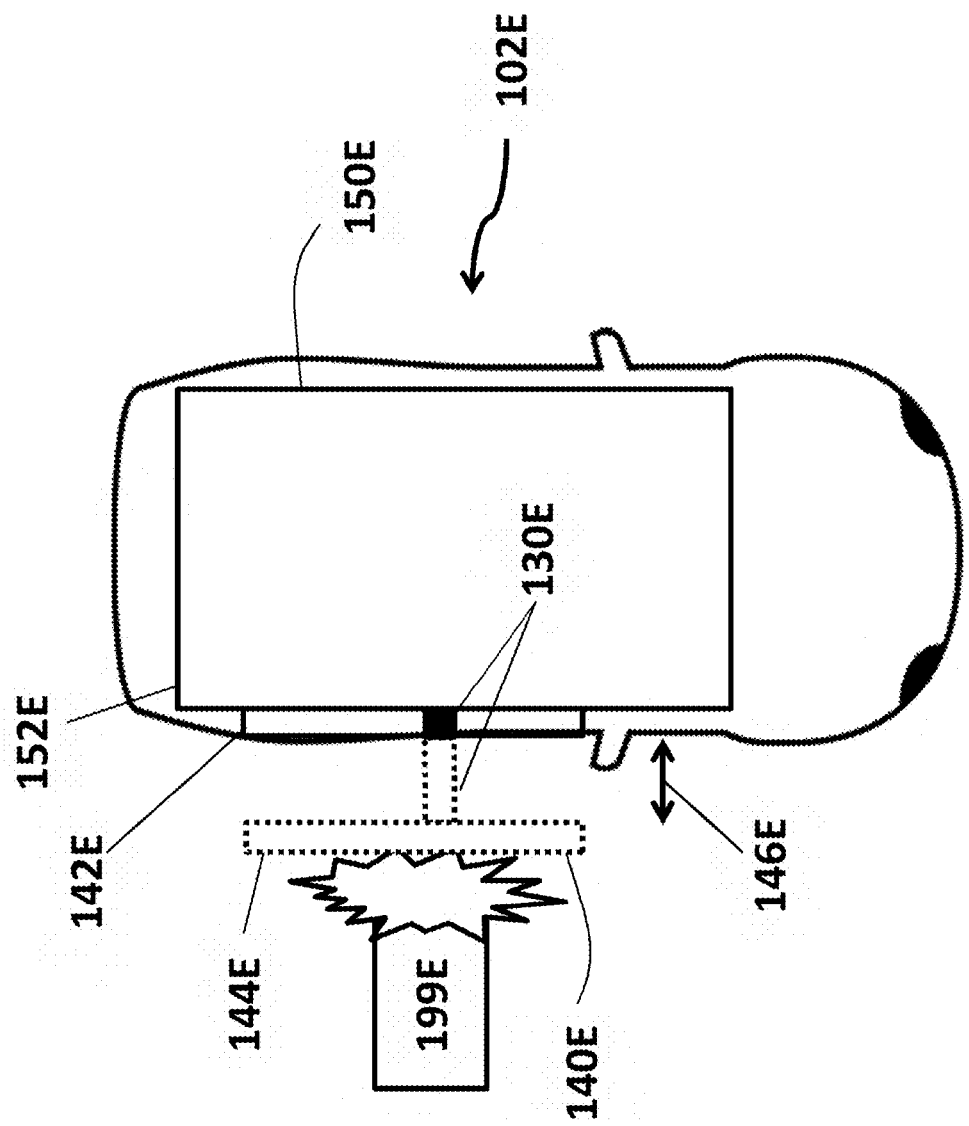
FIG. 2E illustrates a fifth embodiment and scenario in which an adjustable exterior vehicle component may be adjusted from a first physical configuration to a second physical configuration.

FIG. 2E illustrates a fifth embodiment and scenario in which an adjustable exterior vehicle component may be adjusted from a first physical configuration to a second physical configuration. As FIG. 2E illustrates, vehicle 102E comprises an adjustable exterior vehicle component 140E, a vehicle frame component 150E, and an actuator component 130E. The adjustable exterior vehicle component 140E is disposed in a first physical configuration 142E external to the vehicle frame component 150E. The actuator component 130E is configured to physically couple the adjustable exterior vehicle component 140E and the vehicle frame component 150E, and to adjust the physical configuration of the adjustable exterior vehicle component 140E. In this embodiment, the actuator component 130E may include, or be coupled to, a gear system, a mechanical spring, rotary platform, telescoping apparatus, piston strut, shock absorber, and/or other device configured to adjust the physical configuration of the adjustable exterior vehicle component 140E. The vehicle frame component 150E is disposed in a physical configuration 152E. In this embodiment, the actuator component 130E extends the adjustable exterior vehicle component 140E a length 146E from the first physical configuration 142E to a second physical configuration 144E in response to the vehicle computer determining that an external driving condition has been detected. The vehicle frame component 150E, however, remains static by maintaining the physical configuration 152E. For example, in a scenario in which the processor detects that the vehicle 102E is going to be T-boned by an approaching vehicle 199E, the processor may cause the actuator component 130E to adjust the physical configuration of the adjustable exterior vehicle component 140E from a current/initial physical configuration (the first physical configuration 142E) outwards to a new physical configuration (the second physical configuration 144E), to dampen/reduce the impact/force created by the impending collision between the vehicle 102E and the vehicle 199E. Dampening the impact caused by the impending side collision may reduce the risk of/prevent injury to a passenger of the vehicle 102E. It should be appreciate that in some embodiments the adjustable exterior vehicle component 140E may be adjusted from a first physical configuration (e.g., 144E) inwards to a second physical configuration (e.g., 142E) to dampen/reduce the impact/force created by the impending collision between the vehicle 102E and the vehicle 199E.

FIG. 2F illustrates a sixth embodiment and scenario in which an adjustable exterior vehicle component may be adjusted from a first physical configuration to a second physical configuration. As FIG. 2F illustrates, vehicle 102F comprises an adjustable exterior vehicle component 140F, a vehicle frame component 150F, and an actuator component 130F. The adjustable exterior vehicle component 140F is disposed in a first physical configuration 142F external to the vehicle frame component 150F. The actuator component 130F is configured to physically couple the adjustable exterior vehicle component 140F and the vehicle frame component 150F, and to adjust the physical configuration of the adjustable exterior vehicle component 140F. In this embodiment, the actuator component 130F may include, or be coupled to, a gear system, a mechanical spring, rotary platform, telescoping apparatus, piston strut, shock absorber, and/or other device configured to adjust the physical configuration of the adjustable exterior vehicle component 140F. The vehicle frame component 150F is disposed in a physical configuration 152F. In this embodiment, the actuator component 130F rotates the adjustable exterior vehicle component 140F about a roll angle 146F, relative to the vehicle frame component 150F, to a second physical configuration 144F in response to the vehicle computer determining that an external driving condition has been detected. The vehicle frame component 150F, however, remains static by maintaining the physical configuration 152F. For example, in a scenario in which a processor (e.g., the processor 202 of FIG. 1B) detects that the vehicle 102F is going to be in a collision with an approaching vehicle 199F, the processor may cause the actuator component 130F to adjust the physical configuration of the adjustable exterior vehicle component from a current/initial physical configuration (the first physical configuration 142F) about a roll angle to a new physical configuration (the second physical configuration 144F), to dampen/reduce the impact/force created by the impending collision between the vehicle 102F and the vehicle 199F. Dampening the impact caused by the impending collision may reduce the risk of/prevent injury to a passenger of the vehicle 102F.

FIG. 2G illustrates a seventh embodiment and scenario in which an adjustable exterior vehicle component may be adjusted from a first physical configuration to a second physical configuration. As FIG. 2G illustrates, vehicle 102G comprises an adjustable exterior vehicle component 140G and a vehicle frame component 150G. The adjustable exterior vehicle component 140G is disposed in a first physical configuration 142G external to the vehicle frame component 150G. The vehicle frame component 150G is disposed in a physical configuration 152G. The adjustable exterior vehicle component 140G is adjusted about a pitch angle 146G, relative to the vehicle frame component 150G, to a second physical configuration 144G in response to the vehicle computer determining that an external driving condition has been detected. Accordingly, the adjustable exterior vehicle component 140G rotates in a clockwise or counter-clockwise motion (relative to a profile view of the vehicle 102G). The vehicle frame component 150G, however, remains static by maintaining the physical configuration 152G. For example, in a scenario in which a processor (e.g., the processor 202 of FIG. 1B) detects that the vehicle 102G is going to be in a collision with an approaching vehicle 199G, the processor may cause the actuator component to adjust the physical configuration of the adjustable exterior vehicle component from a current/initial physical configuration (the first physical configuration 142G) about a pitch angle to a new physical configuration (the second physical configuration 144G) to dampen/reduce the impact/force created by the impending collision between the vehicle 102G and the vehicle 199G. Dampening the impact caused by the impending collision may reduce the risk of/prevent injury to a passenger of the vehicle 102G.

Figure 2H:
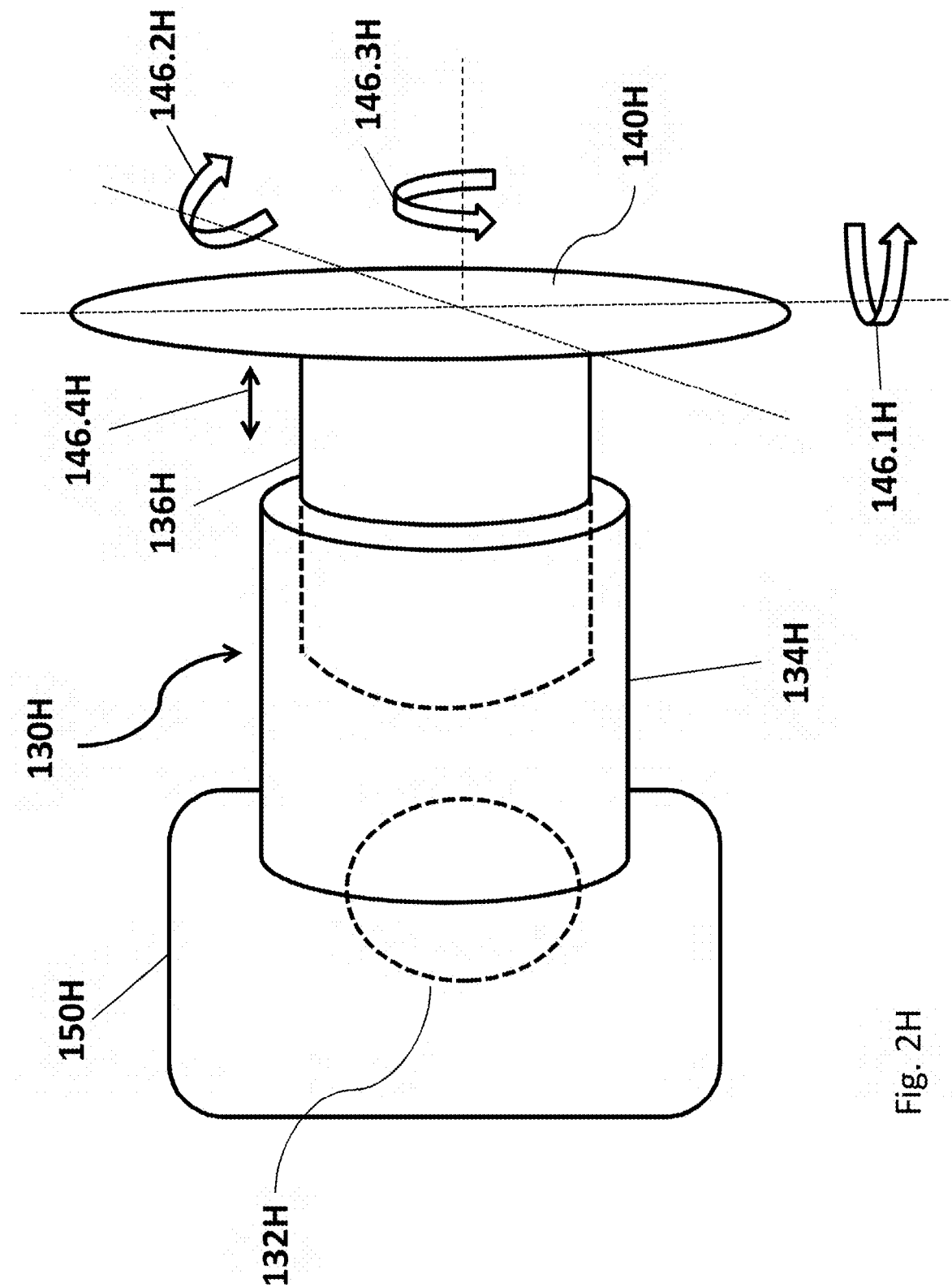
FIG. 2H illustrates a first embodiment of an actuator component configured to adjust the physical configuration of an adjustable exterior vehicle component.

FIG. 2H illustrates a first embodiment of an actuator component configured to adjust the physical configuration of an adjustable exterior vehicle component. As FIG. 2H illustrates, and as previously discussed, an actuator component 130H is configured to physically couple the adjustable exterior vehicle component 140H and the vehicle frame component 150H, and to adjust the physical configuration of the adjustable exterior vehicle component 140H while the vehicle frame component 150H maintains a static physical configuration. In some embodiments, the actuator component 130H may include a rotatable component 132H, an impact dampening component 134H, and/or a strut component 136H. The rotatable component 132H is configured to rotate the physical configuration of the adjustable exterior vehicle component 140H about a yaw angle 146.1H, a roll angle 146.2H, and/or a pitch angle 146.3H, relative the vehicle frame component 150H, which remains static. The rotatable component 132H may be a single component (e.g., a gyroscope, a gear, a cog) or multiple components (e.g., multiple gears, cogs, etc.). The impact dampening component 134H is configured to dampen/absorb/reduce/lessen/diminish a force exerted on an important or sensitive portion of a vehicle (e.g., the vehicle frame component 150H and possibly other components having a fixed configuration relative to the vehicle frame component 150H). The impact dampening component 134H may be a mechanical spring, polyurethane material, hydraulic fluid system, shock absorber, and/or other material or device configured to dampen a force exerted on the vehicle. It should be appreciated that the impact dampening component 134H may be a single component, a single component utilizing a plurality of impact dampening technologies, or multiple components. The strut component 136H is configured to adjust the physical configuration of the adjustable exterior vehicle component 140H. In some embodiments, the strut component 136H is coupled with the impact dampening component 134H to act as an impact dampening system such as a mechanical spring, piston strut, shock absorber, and/or other system configured to dampen a force exerted on the vehicle. In some embodiments, the strut component 136H may be partially or wholly enclosed within the impact dampening component 134H. In some embodiments, the impact dampening component 134H may be partially or wholly enclosed within the strut component 136H. In some embodiments the impact dampening component 134H and the strut component 136H may be a single component. In some embodiments, the strut component 136H is configured to extend/contract to adjust the physical configuration of the adjustable exterior vehicle component 140H by a length of 146.4H, relative to the vehicle frame component 150H. It should be appreciated that the actuator component 130H may include a plurality of rotatable components 132H, impact dampening components 134H, and/or strut components 136H. In some embodiments, the actuator component 130H may operate like a Stewart strut system, where the vehicle frame component 150H is a platform component that remains in a static physical configuration. The actuator component 130H may be used in embodiments and scenarios such as those described in FIGS. 2A, 2B, 2C, 2D, 2E, 2F, and 2G, for example.

FIG. 2I.1 illustrates a profile view of a second embodiment of an actuator component configured to adjust the physical configuration of an adjustable exterior vehicle component. As FIG. 2I.1 illustrates, and as previously discussed, an actuator component 130I is configured to physically couple the adjustable exterior vehicle component 140I and the vehicle frame component 150I, and to adjust the physical configuration of the adjustable exterior vehicle component 140I while the vehicle frame component 150I maintains a relatively static physical configuration. In some embodiments, the actuator component 130I may include a first rotatable component 132.1I, a second rotatable component 132.2I, a third rotatable component 132.3I, an impact dampening component 134I, and a strut component 136I. Each of the first rotatable component 132.1I, the second rotatable component 132.2I, and the third rotatable component 132.3I may be a single component (e.g., a gyroscope, a gear, a cog) or multiple components (e.g., multiple gears, cogs, etc.). The first rotatable component 132.1I is configured to couple the impact dampening component 134I and the adjustable exterior vehicle component 140I, and to adjust the physical configuration of the adjustable exterior vehicle component 140I inwards/outwards. In some embodiments, the first rotatable component 132.1I may be configured to lock (e.g., using a gear teeth or cog system) into the impact dampening component 134I in order to restrict movement of the adjustable exterior vehicle component 140I. The second rotatable component 132.2I is configured to couple the strut component 136I and the vehicle frame component 150I, and to adjust the physical configuration of the strut component 136I inwards/outwards in order to adjust the physical configuration of the adjustable exterior vehicle component 140I inwards/outwards. In some embodiments, the second rotatable component 132.2I may be configured to lock (e.g., using a gear teeth or cog system) into the strut component 136I in order to restrict movement of the adjustable exterior vehicle component 140I. The impact dampening component 134I is configured to dampen/absorb/reduce/lessen/diminish a force exerted on the vehicle that includes the vehicle frame component 150I.

The third rotatable component 132.3I is configured to rotate the physical configuration of the actuator component 130I about a yaw angle, a roll angle, and/or a pitch angle, relative the vehicle frame component 150I, which remains static. The impact dampening component 134I may be or include a mechanical spring, polyurethane material, hydraulic fluid system, piston strut, shock absorber, and/or other material or device configured to dampen a force exerted on the vehicle. An exterior portion, or a part of the exterior portion, of the impact dampening component 134I may include gears, grooves, cogs, or teeth configured to clasp with the gears, grooves, cogs, or teeth of the first rotatable component 132.1I. It should be appreciated that the impact dampening component 134I may be a single component, a single component utilizing a plurality of impact dampening technologies, or multiple components. The strut component 136I is configured to adjust the physical configuration of the adjustable exterior vehicle component 140I. The exterior portion, or a part of the exterior portion, of the strut component 136I may include gears, grooves, cogs, or teeth configured to clasp with the gears, grooves, cogs, or teeth of the second rotatable component 132.2I. In some embodiments, the strut component 136I is coupled with the impact dampening component 134I to act as an impact dampening system such as a mechanical spring, piston strut, shock absorber, and/or other system configured to dampen a force exerted on the vehicle. In some embodiments, the strut component 136I may be partially or wholly enclosed within the impact dampening component 134I. In one embodiment, for example, in anticipation of impact, the strut component 136I may be adjusted to telescope/compress to a position that is wholly or partially within the impact dampening component 134I in order to dampen impact to the vehicle. In such embodiments, the strut component 136I may remain fixed/fastened/secured within the strut component 134I after absorbing the impact to the vehicle. Conversely, strut component 136I may be released from within the strut component 134I, e.g. by the spring-loaded system, as a result of the impact to the vehicle. In some embodiments, for example, impact to the vehicle may cause the strut component 136I to compress into the impact dampening component 134I, in a manner that compresses the spring and thereby dampens the impact. The first rotatable component 132.1I and/or the second rotatable component 132.2I may be configured to rotate, respectively, in order to adjust the physical configuration of the exterior adjustable vehicle component 140I, the impact dampening component 134I, and/or the strut component 136I. In some embodiments, the impact dampening component 134I may prepare to dampen a force as the first rotatable component 132.1I and/or the second rotatable component 132.2I move. For example, in an embodiment in which the first rotatable component 132.1I and the second rotatable component 132.2I are cogs, and the impact dampening component 134I is a mechanical spring, movement of the cog 132.1I and/or cog 132.2I may cause the mechanical spring to load (in preparation for dampening impact) while also adjusting the physical configuration of the adjustable exterior vehicle component 140I. In the embodiment illustrated, the adjustable exterior vehicle component 140I is contracted inward and fastened into a spring-locked physical configuration, that absorbs an incoming force, when the first rotatable component 132.1I moves in a counterclockwise direction, about grooves of the impact dampening component 134I, and the second rotatable component 132.2I moves in a counterclockwise direction, about grooves of a strut component 136I. However, it should be appreciated that in some embodiments, the first rotatable component 132.1 moves in a clockwise direction, about grooves of the impact dampening component 134I, and the second rotatable component 132.2I moves in a clockwise direction, about grooves of a strut component 136I. The grooves of the first rotatable component 132.1I and the grooves on the exterior of the impact dampening component 134I, as well as the grooves of the second rotatable component 132.2I and the grooves of the exterior of the strut component 136I, are configured to lock such that the adjustable exterior vehicle component 140I is prevented from rebounding/recoiling after absorbing the incoming force. In some embodiments, in response to the vehicle computer determining that an external driving condition has been detected, the physical configuration of the actuator component 130I may be adjusted by the third rotatable component 132.3I about a yaw angle, pitch angle, and/or roll angle in order to absorb force at the expect point of impact. The actuator component 130I may be used in embodiments and scenarios such as those described in FIGS. 2A, 2B, 2C, 2D, 2E, 2F, 2G, and/or 2G, for example.

FIG. 2I.2 illustrates a top view of the actuator 130I. The components illustrated in FIG. 2I.2 correspond to and operate in the same manner as the like-numbered components shown in FIG. 2I.1. In this embodiment, for example, in response to the vehicle computer determining that an external object is going to collide with the back left side of the vehicle, the physical configuration of the actuator component 130I is adjusted by the third rotatable component 132.3I about a yaw angle 146I in order to absorb force at the expected point of impact.

Figure 3:
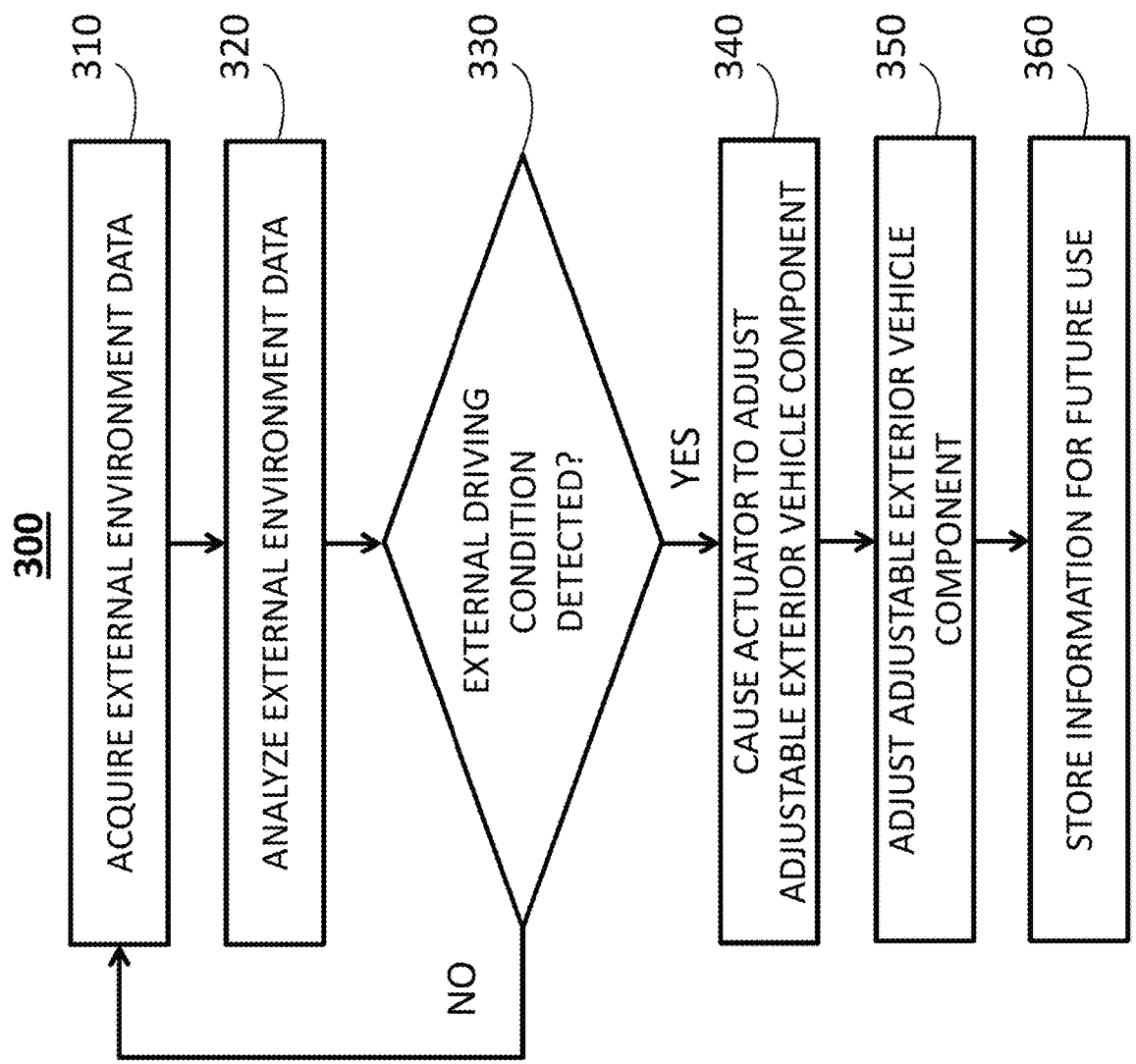
FIG. 3 illustrates a method for adjusting the physical configuration of an adjustable exterior vehicle component of a vehicle in response to a processor detecting an external driving condition.

FIG. 3 illustrates a method 300 in which the physical configuration of an adjustable exterior vehicle component of a vehicle (e.g., the adjustable exterior vehicle component 140 of the vehicle 102 in FIG. 1A) is adjusted in response to a processor (e.g., processor 202 of FIG. 1B) detecting an external driving condition. In some embodiments, the method 300 is a method for implementing an embodiment of the system 100 for controlling the physical configuration of an adjustable exterior vehicle component. For example, the method 300 may be implemented as described above in connection with FIGS. 1A and 1B. Accordingly, the method 300 may be partially or completely implemented on the vehicle computer 200.

In the method 300, driving environment data indicative of a physical environment external to the vehicle is acquired (block 310). Driving environment data may be collected, generated, and/or received using an external environment component (e.g., the external environment component 112 of FIG. 1A). In some embodiments, some or all of the driving environment data may be received from a third party device, machine, server, network, and/or database. Once collected, the driving environment data may be stored locally within the vehicle, for example in the driving environment data storage 212 of the vehicle computer 200, and/or transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. The third party device, machine, server, network, and/or database may be configured to receive, collect, and/or analyze driving environment data and/or other data in accordance with any of the methods described herein. For example, driving environment data may be received, either directly or through an intermediate network, from other vehicles traveling on the same road as the vehicle and/or an infrastructure component along the road, either directly or through an intermediate network. The vehicle may receive the driving environment data in order to respond/react to conditions within a driving environment.

The received driving environment data is analyzed (e.g., by the processor 202 of the vehicle computer 200 of FIG. 1A) (block 320). In some embodiments, the driving environment data is analyzed in real-time to determine whether an external driving condition exists that may be hazardous to the operation of the vehicle and/or a passenger's safety. In one embodiment, the driving environment data may be analyzed by comparing acquired driving environment data corresponding to current driving environment conditions, and/or previously collected driving environment data corresponding to past driving environment conditions. Examples of current driving environment conditions may include objects currently near the vehicle, objects within the current trajectory of the vehicle, current traffic conditions, current road conditions, current weather conditions, and/or any other data about the current state of the driving environment external to the vehicle. Past conditions may include past traffic conditions, past road conditions, past weather conditions, and/or any other data about the previous state of the driving environment external to the vehicle. Past conditions may also include data about conditions that are similar to the current conditions and may further include data about conditions in the same or similar locations, as well as past behavior/actions of the same or similar type of vehicle, driver, pedestrian, and/or animal near the vehicle.

The driving environment data may also be analyzed to predict the likelihood of a collision. For example, the expected path of a nearby vehicle may be predicted, in furtherance of determining whether an external driving condition exists.

The method 300 detects whether an external driving condition exists based on the analysis of the driving environment data (block 330). The existence of an external driving condition may be determined by comparing the driving environment data with a maximum or minimum criteria/threshold that is indicative of the point at which an external driving condition is detected. In some embodiments, the criteria/threshold indicative of the point at which an external driving condition is detected may be stored in a data storage unit (for example the external driving condition criteria data storage 216 of FIG. 1B). To detect the external driving condition, the driving environment data, or the value corresponding to the driving environment data, may need to be equal to/the same as, less than, or greater than the criteria/threshold, or a value corresponding to the criteria/threshold, for example.

These thresholds may apply directly to the driving environment data, or may apply to a more advanced driving environment data analysis. For example, in one embodiment configured to detect whether an adjacent vehicle is going to collide with the vehicle (the external driving condition), data corresponding to the distance between the vehicle and the adjacent vehicle (the driving environment data) may be analyzed by a processor. In such an embodiment, the threshold for detecting an impending collision may be a distance between the two vehicles that is 2-feet or less. Consequently, when the analysis of the driving environment data reveals the distance between the vehicle and the adjacent vehicle is only 1.5-feet, the processor detects that there is a risk of an impending collision (thereby detecting the existence of the external driving condition). However, an impending collision may not be detected until the adjacent vehicle and the vehicle are within 2 feet or less of each other. In this way, until the external driving condition is detected, unnecessarily adjusting the physical configuration of the adjustable exterior vehicle component may be avoided.

Further, depending on other relevant conditions, different threshold values (i.e. larger or smaller) may be used to detect an external driving condition. For example, in detecting the likelihood of an impending collision (the external driving condition) between a vehicle and a nearby vehicle based on the distance between the two vehicles, weather conditions, traffic conditions, and/or road conditions may be taken into account in determining a threshold value. In such an embodiment, when it is snowing and the road is icy, the threshold indicative of an impending collision may increase from "2 feet or less" to "10 feet or less" between the two vehicles because of the increased risk of a vehicle skidding.

Alternatively, in an embodiment, the driving environment data may be used to calculate a different value associated with the likelihood of an external driving condition occurring. In such an embodiment, the external driving condition may be detected when the determined value exceeds a predetermined value, indicative of the likelihood of an external driving condition occurring. The calculated value may reflect, for example, a predicted probability of a collision between the vehicle and an external object, or predicted likelihood of an injury to a passenger traveling in the vehicle. For example, based on the analysis of the collected driving environment data, an impending collision may be detected when there is a 75% chance or higher likelihood that the vehicle and the external object will collide. In another example, based on the analysis of the collected driving environment data, an external driving condition may be detected because the external driving condition is indicative of an above 50% chance that a passenger of the vehicle may suffer an injury.

While some embodiments of the method 300 have been discussed using individual thresholds to detect an external driving condition, it should be appreciated that detection of an external driving condition may entail the use of multiple criteria and/or thresholds, and/or machine learning (as discussed further below). Further, an embodiment using more than one criteria/threshold may not require that every criterion/threshold be met/exceeded to determine a driving condition exists. For example, in one embodiment and scenario, driving environmental data may be analyzed to determine whether a moving vehicle (such as the external object 199 of FIG. 1A) is going to collide with a stationary vehicle (such as the vehicle 102 of FIG. 1A). Data related to criteria such as the distance between the moving vehicle and the stationary vehicle, the speed of the moving vehicle, the trajectory of the moving vehicle, the slipperiness of the road on which the moving vehicle is driving on, whether the stationary vehicle is parked or just has the brakes temporarily applied, whether the stationary vehicle has sufficient space or time to move out of the trajectory of the vehicle, and/or any other relevant criteria, may be analyzed to detect whether a collision between the two vehicles may occur. While the speed of the vehicle may be determined to not exceed a threshold indicative of an impending collision with the stationary vehicle, the external driving condition of collision between the two vehicles may nonetheless still be detected because the slipperiness of the road exceeds a certain threshold value and the stationary vehicle is parked and does not have adequate space and/or time to move out of the trajectory of the moving vehicle.

In some embodiments, one or more real-time calculations may be performed, using the driving environment data, to determine whether an external driving condition exists. In an example in which the vehicle is stopped but another vehicle (the external object) is approaching the vehicle, driving environment data corresponding to the approaching vehicle's speed and the distance between the two vehicles may be analyzed to determine whether a collision will occur. The collecting driving environment data may be used to calculate whether the approaching vehicle is travelling at a speed for which it would be physically incapable of stopping, given the distance between the two vehicles, without colliding with the stopped vehicle. In another example, driving environment data corresponding to a speed limit in kilometers per hour may be collected and then converted into a speed limit in miles per hour in furtherance of detecting an external driving condition.

When the external driving condition is not detected, then the method returns to block 310 to collect more driving environment data and repeats the method 300 as described above (e.g., on a periodic basis). However, when the external driving condition is detected, then the method proceeds to block 340.

In response to detecting the external driving condition, an actuator component (such as the actuator component 130 of FIG. 1A) is caused to adjust the physical configuration of the adjustable exterior vehicle component (such as the adjustable exterior vehicle component 140 of FIG. 1A) to a second physical configuration (block 340). The second physical configuration may correspond to data stored in a data storage unit (e.g. the AEVC configuration data storage 234 of FIG. 1B).

In some embodiments, passenger data, collected by an interior data collection component (such as the interior data collection component 120 of FIG. 1A) and stored in a data storage (such as the interior vehicle configuration data storage 236 and/or passenger profile data storage 238 of FIG. 1B), may also be used to determine and/or affect the second physical configuration of the adjustable exterior vehicle component. For example, if a passenger is pregnant, this information may be factored into determining how/where to cause the actuator component to adjust the adjustable exterior vehicle component because certain movements (e.g. rapid or sharp movements) and/or configurations (e.g. a configuration that puts pressure on the passenger's stomach) may be detrimental to the pregnant passenger and/or her child.

Similarly, for example, if a passenger has a back injury/condition, moving the adjustable exterior vehicle component to a certain configuration may cause the passenger discomfort and/or may further aggravate the condition. Therefore, this passenger information may be considered in determining how to adjust the adjustable exterior vehicle component.

After the second physical configuration of the adjustable exterior vehicle component has been determined, the physical configuration of the adjustable exterior vehicle component may be adjusted from the first physical configuration to the second physical configuration (block 350).

In some embodiments of the method 300, information received, generated, calculated, detected, and/or determined during the method 300 may be stored for future use (block 360). Stored information may include, but is not limited to, the driving environment data collected at block 310, the external driving condition detected at block 330, and/or the second physical configuration determined at block 340. Storing this information for future use may be used to improve the accuracy and speed of analyzing driving environment data, detecting an external driving condition, training machine learning models that may be used for detecting the external driving condition, determining a physical configuration of an adjustable exterior vehicle component, and/or adjusting the adjustable exterior vehicle component. The recorded information may be stored locally in the vehicle computer and/or may be transmitted to a third party machine (e.g., if a driver has expressly agreed to participate in a program involving data collection/sharing). In some embodiments, recorded information may be used for generating, adjusting, evaluating, investigating, analyzing, or prospecting insurance coverage, parameters of the insurance policy (e.g., a deductible), a premium, a rate, a discount, and/or a reward for the specific driver, passenger, or the insured individual.

The processor may take into account the existence of multiple passengers in the vehicle when determining the second physical configuration of the adjustable exterior vehicle component. For example, in an embodiment in which two passengers are traveling in the vehicle, when the processor detects an external driving condition, the processor may consider the physical configuration of both passengers' seats (and/or external conditions) before adjusting the adjustable exterior vehicle component to avoid harming either passenger. Thus, for example, when the processor determines the vehicle is set to collide head-on with another vehicle, the adjustable exterior vehicle component may be adjusted to a physical configuration to minimize injury to both passengers and/or to avoid the collision.

In some embodiments, the external driving condition may be detected using machine learning techniques, such as cognitive learning, deep learning, combined learning, heuristic engines and algorithms, and/or pattern recognition techniques. For example, the processor 202 may implement a model that is trained using supervised or unsupervised machine learning, and the machine learning program may employ a neural network (e.g., a convolutional neural network, a deep learning neural network, or a combined learning module or program that learns in two or more fields or areas of interest). Machine learning may involve identifying and recognizing patterns in existing data in order to facilitate making predictions for subsequent data. Models may be created based upon example inputs in order to make valid and reliable predictions for novel inputs.

In some embodiments, machine learning techniques may also, or instead, be utilized to determine when the existence of an external driving condition is sufficiently hazardous to warrant adjusting the physical configuration of the adjustable exterior vehicle component, and/or to determine the best manner in which to adjust the physical configuration. In such embodiments, the driving environment data may be considered in combination with passenger data to evaluate whether the risk warrants adjusting the physical configuration of the adjustable exterior vehicle component.

Additionally or alternatively, the machine learning programs may be trained by inputting sample data sets or certain data into the programs, such as image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, the insurer database, a third-party database, and/or other data.

In one embodiment, a processor (and/or machine learning or heuristic engine or algorithm discussed herein) may be trained by providing it with a large sample of images and/or user data with known characteristics or features, such as historical vehicle data and/or past auto claim data. Based upon these analyses, the processing element may learn how to identify characteristics and patterns that may then be applied to analyzing user device details, user vehicle details, user device sensors, geolocation information, image data, the insurer database, a third-party database, and/or other data. For example, the processing element may learn, with the user's permission or affirmative consent, to identify the user and/or insured vehicles, and/or learn to identify insured vehicles characteristics. The processing element may also predict which vehicles are more prone to be classified as a total loss in the event of a vehicle collision, such as by vehicle characteristics determined from vehicle or other data.

ADDITIONAL CONSIDERATIONS

Unless specifically stated otherwise, discussions herein using words such as "processing," "computing," "calculating," "determining," "detecting," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to an improvement to computer functionality, and improve the functioning of conventional computers.

What is claimed:

1. A system for dampening impact to a vehicle, the system comprising:
   a vehicle frame component;
   a plurality of adjustable exterior vehicle body components coupled to the vehicle frame component, wherein the vehicle body components partially surround a vehicle and are configurable to absorb an external force exerted on the vehicle;
   a plurality of actuator components configured to adjust physical configurations of the vehicle body components relative to the vehicle frame component;
   an external communication component configured to actively scan an external environment of the vehicle for one or more external objects; and
   one or more processors configured to:
      detect, by processing the driving environment data, an external driving condition, wherein the external driving condition is an impending collision between the vehicle and one or more objects external to the vehicle, and
      when the external driving condition is detected, cause the actuator components to correspondingly adjust in near real-time the physical configurations of the vehicle body components relative to the vehicle frame component in order for the exterior vehicle body component to absorb the maximum amount of an external force exerted on the vehicle during a collision.

2. The system of claim 1, wherein the one or more processors are configured to detect the impending collision by at least one of (i) determining a closing speed between the vehicle and the one or more objects external to the vehicle, or (ii) determining a distance between the vehicle and the one or more objects external to the vehicle.

3. The system of claim 1, wherein the one or more processors are configured to detect the impending collision by determining at least one of (i) a predicted trajectory of the vehicle, or (ii) a predicted trajectory of the one or more objects external to the vehicle.

4. The system of claim 1, wherein the external communication component configured to collect the driving environment data is at least one of (i) a sensor configured to sense the external environment of the vehicle, or (ii) a transceiver configured to collect data from one or more sources external to the vehicle.

5. The system of claim 1, wherein the actuator components are configured to adjust the physical configurations of the vehicle body components by adjusting at least one of yaw angles, pitch angles, or roll angles of the vehicle body components relative to the vehicle frame component.

6. The system of claim 1, wherein the actuator components are configured to adjust the physical configurations of the vehicle body components by moving the external vehicle body components in at least one of forward, backward, upward, downward, clockwise, counterclockwise, or lateral directions relative to the vehicle frame component.

7. The system of claim 1, further comprising a plurality of frame coupling components configured to couple the vehicle body components to the vehicle frame component, wherein the actuator components include gear assemblies that are coupled to the frame coupling components and are configured to cause the vehicle body components to move relative to the vehicle frame component.

8. The system of claim 7, wherein the one or more processors are configured to cause the actuator components to correspondingly adjust the physical configurations of the vehicle body components by:
determining, based on the driving environment data, impact absorption physical configurations of the vehicle body components that would cause the vehicle body components to absorb the external force exerted on the vehicle; and
causing the gear assemblies to adjust the physical configurations of the vehicle body components to the impact absorption physical configurations.

9. The system of claim 1, wherein a first vehicle body component of the vehicle body components includes at least one of a mechanical spring, a rotary platform, polyurethane material, a hydraulic fluid system, a telescoping apparatus, a piston strut, or a shock absorber.

10. A method for dampening impact to a vehicle, the method comprising:
scanning, via an external communication component, an external environment of the vehicle for one or more external objects;
receiving, via one or more processors, data representing the external environment of the vehicle;
detecting, by processing the data using the one or more processors, an external driving condition, wherein the external driving condition is an impending collision between the vehicle and the one or more objects external to the vehicle; and
adjusting in near real-time, via a plurality of actuator components, a physical configuration of a plurality of adjustable exterior vehicle body components that partially surround a vehicle frame component, wherein the exterior vehicle body components absorb a maximum amount of an external force exerted on the vehicle resulting from a collision.

11. The method of claim 10, wherein detecting the impending collision includes at least one of (i) determining a closing speed between the vehicle and the one or more objects external to the vehicle, or (ii) determining a distance between the vehicle and the one or more objects external to the vehicle.

12. The method of claim 10, wherein detecting the impending collision includes determining at least one of (i) a predicted trajectory of the vehicle, or (ii) a predicted trajectory of the one or more objects external to the vehicle.

13. The method of claim 10, further comprising detecting the data with at least one of (i) a sensor configured to sense the external environment of the vehicle, or (ii) a transceiver configured to collect the data from one or more sources external to the vehicle.

14. The method of claim 10, wherein the actuator components are configured to adjust the physical configurations of the vehicle body components by adjusting at least one of yaw angles, pitch angles, or roll angles of the vehicle body components relative to a vehicle frame component.

15. The method of claim 10, wherein the actuator components are configured to adjust the physical configurations of the vehicle body components by moving the vehicle body components in at least one of forward, backward, upward, downward, clockwise, counterclockwise, or lateral directions relative to the vehicle frame component.

16. The method of claim 10, wherein the vehicle body components are coupled to the vehicle frame components by a plurality of frame coupling components, and the actuator components include gear assemblies that are coupled to the frame coupling components and are configured to cause the vehicle body components to move relative to the vehicle frame component.

17. The method of claim 16, further comprising:
determining, based on the data, impact absorption physical configurations of the vehicle body components that would cause the vehicle body components to absorb the external force exerted on the vehicle; and
causing the gear assemblies to adjust the physical configurations of the vehicle body components to the impact absorption physical configurations.

18. The method of claim 10, wherein a first vehicle body component of the vehicle body components includes at least one of a mechanical spring, a rotary platform, polyurethane material, a hydraulic fluid system, a telescoping apparatus, a piston strut, or a shock absorber.

* * * * *